US007875455B1

(12) United States Patent
Li et al.

(10) Patent No.: US 7,875,455 B1
(45) Date of Patent: *Jan. 25, 2011

(54) REAL TIME OIL RESERVOIR EVALUATION USING NANOTECHNOLOGY

(75) Inventors: Jing Li, San Jose, CA (US); Meyya Meyyappan, San Jose, CA (US)

(73) Assignee: The United States of America as represented by the Administrator of the National Aeronautics and Space Administration (NASA), Washington, DC (US)

( * ) Notice: Subject to any disclaimer, the term of this patent is extended or adjusted under 35 U.S.C. 154(b) by 778 days.

This patent is subject to a terminal disclaimer.

(21) Appl. No.: 11/489,803

(22) Filed: Jul. 12, 2006

Related U.S. Application Data

(63) Continuation-in-part of application No. 11/178,079, filed on Jul. 8, 2005, and a continuation-in-part of application No. 11/416,505, filed on Apr. 28, 2006.

(51) Int. Cl.
*G01N 33/24* (2006.01)
*G01N 27/06* (2006.01)
*G01N 25/00* (2006.01)
*G01N 7/00* (2006.01)
*G01N 27/04* (2006.01)

(52) U.S. Cl. .................. 436/28; 422/82.02; 422/82.12; 422/82.13; 422/98; 436/29; 977/957

(58) Field of Classification Search ............... 422/50, 422/68.1, 82.01, 82.02, 82.12, 82.13, 83, 422/98; 436/25, 28, 29; 977/902, 932, 953, 977/957

See application file for complete search history.

(56) References Cited

U.S. PATENT DOCUMENTS

| | | | |
|---|---|---|---|
| 6,289,328 | B2 | 9/2001 | Shaffer |
| 6,528,020 | B1 | 3/2003 | Dai et al. |
| 6,537,498 | B1 | 3/2003 | Lewis |
| 7,312,095 | B1 | 12/2007 | Gabriel et al. |
| 7,318,908 | B1 | 1/2008 | Dai |
| 2003/0175161 | A1 | 9/2003 | Gabriel et al. |
| 2005/0126913 | A1 | 6/2005 | Burke et al. |
| 2005/0169798 | A1 | 8/2005 | Bradley et al. |

OTHER PUBLICATIONS

J. Calusdian et al., Design and Testing of a Wireless Portable Carbon Nanotube-Based Chemical Sensor System, Sixth IEEE Conference on Nanotechnology, pp. 794-797 (Jun. 17-20, 2006).*
Final Rejection in related case, mailing date May 28, 2009, U.S. Appl. No. 11/178,079, filed Jul. 8, 2005.
First Office Action in related case, mailed Sep. 4, 2009, U.S. Appl. No. 11/416,505, filed Apr. 28, 2006.
Shaffer, et al. A comparison study of chemical sensor array pattern recognition algorithms, Analytica Chimica Acta 384, 1999, 305-317, Elsevier.

Nonfinal rejection in related case, mailed Oct. 29, 2008, U.S. Appl. No. 11/178,079, filed Jul. 8, 2005.
Response to nonfinal rejection in related case, filed Apr. 29, 2009, U.S. Appl. No. 11/178,079, filed Jul. 8, 2005.
Response to final rejection in related case, mailed May 28, 2009, U.S. Appl. No. 11/178,079, filed Jul. 8, 2005.
Nonfinal rejection in related case, mailed Mar. 12, 2008, U.S. Appl. No. 11/591,630, filed Oct. 31, 2006, Patent No. 7,623,972, issued Nov. 24, 2009.
Response to nonfinal rejection in related case, filed Sep. 10, 2008, U.S. Appl. No. 11/591,630, filed Oct. 31, 2006, Patent No. 7,623,972, issued Nov. 24, 2009.
Response to Nonfinal Rejection in related case, mailed Sep. 4, 2009, U.S. Appl. No. 11/416,505, filed Apr. 28, 2010. Response filed Mar. 4, 2010.
Final Rejection in related case, mailed Jun. 24, 2010, U.S. Appl. No. 11/416,505, filed Apr. 28, 2010.
Clinke, et al., Pore structure of raw and purified HiPco single-walled carbon nanotubes, Chenical Physics Letters, 2002, 69-74, 365, www.elsevier.com/locate/cplett, Elsevier Science B. V.
Kong, et al., Nanotube Molecular Wires as Chemical Sensors, Science, Jan. 28, 2000, 622-655, 287, www.sciencemag.org/cgi/content/Ifull/287/5453/622.
Li, The Cyranose Chemical Vapor Analyzer, Sensors, Aug. 2000, 1-9.
Li, Carbon Nanotube Applications: Chemical and Physical Sensors, Carbon Nanotubes: Science & Applications, 2004, 213-233, CRC Press LLC, Boca Raton, Florida.
Li, et al., Carbon Nanotube Sensors for Gas and Organic Vapor Detection, Nano Letters, 2003, 929-933, 3-7.
Li, et al., A Gas Sensor Array Using Carbon Nanotubes and Microfabrication Technology, Electrochemical and Solid-State Letters, 2005, H100-H102, 8, The Electrochemical Society, Inc.
Li, et al., Nano Chemical Sensors With Polymer-Coated Carbon Nanotubes, IEEE Sensors Journal, Oct. 5, 2006, 1047-1051, 6-5, IEEE.

(Continued)

*Primary Examiner*—Glenn Caldarola
*Assistant Examiner*—Randy Boyer
(74) *Attorney, Agent, or Firm*—John F. Schipper; Robert M. Padilla

(57) ABSTRACT

A method and system for evaluating status and response of a mineral-producing field (e.g., oil and/or gas) by monitoring selected chemical and physical properties in or adjacent to a wellsite headspace. Nanotechnology sensors and other sensors are provided for one or more underground (fluid) mineral-producing wellsites to determine presence/absence of each of two or more target molecules in the fluid, relative humidity, temperature and/or fluid pressure adjacent to the wellsite and flow direction and flow velocity for the fluid. A nanosensor measures an electrical parameter value and estimates a corresponding environmental parameter value, such as water content or hydrocarbon content. The system is small enough to be located down-hole in each mineral-producing horizon for the wellsite.

31 Claims, 16 Drawing Sheets

OTHER PUBLICATIONS

Lu, et al., Room temperature methane detection using palladium loaded single-walled carbon nanotube sensors, Chemical Physics Letters, 2004, 344-348, 391, Elsevier B.V.

Lu, et al., A carbon nanotube sensor array for sensitive gas discrimination using principal component analysis, Journal of Electroanalytical Chemistry, 2006, 105-110, 593, Elsevier B.V.

Matthews, et al., Effects of Electrode Configuration on Polymer Carbon-Black Composite Chemical Vapor Sensor Performance, IEEE Sensors Journal, Jun. 2002, 160-168, 2-3, IEEE.

Young, et al., High-Sensitivity NO2 Detection with Carbon Nanotube—Gold Nanoparticle Composite Films, Journal of Nanoscience and Nanotechnology, 2005, 1509-1513, 5, American Scientific Publishers, USA.

Janata, Principles of Chemical Sensors, 1989, pp. 175-239, Plenum Press, New York.

Calusdian, et al., Design and Testing of a Wireless Portable Carbon Nanotube-Based Chemical Sensor System, Sixth IEEE Conference on Nanotechnology, Jun. 17-20, 2006, 794-797.

* cited by examiner

Pd particle   SWNTs

REAL TIME OIL RESERVOIR EVALUATION USING NANOTECHNOLOGY

RELATION TO OTHER APPLICATIONS

This application is a Continuation In Part of U.S. Ser. No. 11/178,079, filed 8 Jul. 2005, and of U.S. Ser. No. 11/416,505, filed 28 Apr. 2006.

ORIGIN OF THE INVENTION

This invention was made by one or more employees of the U.S. government. The U.S. government has the right to make, use and/or sell the invention described herein without payment of compensation, including but not limited to payment of royalties.

FIELD OF THE INVENTION

This invention relates to use of nanotechnology-based chemical sensors to evaluate chemical and physical parameters associated with oil or gas well exploration, development and operation.

BACKGROUND OF THE INVENTION

Current mechanical, electromagnetic or optical sensor technologies are relatively low-tech and passive, and do not acquire data at sufficient distances to permit reservoir managers to fully comprehend the chemical composition, volume and dynamics of the petroleum in a given reservoir. The most advanced tool for monitoring the wells is a multiphase flow meter. It monitors the flow rate of oil, water and gas. There is no tool or methodology that can provide the information about the quality of the oil such as hydrocarbon content and the oil to water ratio, which related to the volume and production enhancement methods (i.e. steam injection).

In large part, the future of the oil and gas industry depends on the ability to better understand the volume and dynamics of a reservoir to optimize production and avoid damaging the reservoir or interrupting flow through over-production or other production enhancement methods such as steam injection. The disclosed chemical nanosensor network, combined with the physical (micro)sensors such as humidity, temperature and pressure, acoustic or electromagnetic wave, form a monitoring system can substantially improve the quality and production of the oil by monitoring the chemical composition in wells and then feed back the information to the decision maker to modify and fine tune the production enhancement methods in real time to improve the oil quality and control the quantity. Without adequate and reasonably complete data for a candidate wellsite, the success rate is presently 20-25 percent and has not increased much in the last 20 years.

The geographic market for this technology is global. Large and small U.S. and North American reservoirs are applicable, so as those worldwide reservoirs. The potential of this new technology to dramatically increase oil production will have a significant downward impact on world prices. Even a marginal enhancement of the sensor capability of oil and gas monitoring will produce exponential benefits. The potential of heavy oil is entirely technology driven. In situ production methods (as opposed to open pit mining methods) require steam injection that causes the liquefaction of tar sands deposits. But without solid data regarding the dynamics of the geological system, production techniques result in only a 20-25% recovery rate. The future ability of conventional oil and gas production to meet world energy demand while also reducing political tensions depends almost entirely on increasing the productivity of known reserves through new technology significantly upward from the current average of approximately 33%. There currently is no active monitoring system on the market capable of meeting that requirement.

What is needed is an integrated system and method for estimating one or more qualitative or quantitative parameters associated with an underground reservoir of a fluid mineral (e.g., oil or natural gas) that permits a more accurate assessment of the economic potential of the reservoir. Preferably, this assessment should include one or more of local (underground) values relative humidity, temperature, gas pressure, fluid level, and/or presence/absence of one or more target molecules, such as $C_mH_n$. Preferably, this assessment should also permit an estimate of direction and flow rate (represented by a current vector J) of the fluid in response to pressurization or other perturbation of the fluid mineral resource. Preferably, this approach should apply to evaluation of a "new" well (identified but not yet developed), of a producing well and of a capped well.

SUMMARY OF THE INVENTION

These needs are met by the invention, which provides a system and associated method for receiving and evaluating relevant parameter values, in exploration and operation of an oil well or a field of adjacent oil wells. One or more nanostructures ("NSs"), including but not limited to carbon nanostructures, in an NS array is coated or doped ("loaded") with a selected chemical substance (e.g, chlorosulfonated polyethylene, hydroxypropyl cellulose or mono-layer protected clusters ("MPCs") of Au. The chemical substance is chosen so that, when an environment with a selected environmental parameter value (e.g., relative humidity, temperature, fluid pressure, fluid motion, presence/absence of a target molecule) is present, a selected electrical parameter (e.g., current, voltage difference, resistance, conductance) will have a corresponding measured parameter value, which preferably varies monotonically with the electrical parameter value. Alternatively, measurement of a single electrical parameter value may correspond to values of each of a group of distinct environmental parameters.

This technology will provide two-dimensional fluid measurements by monitoring the chemical composition in gas or liquid phase and the physical properties of oil level in the wells to have comprehensive digital information from each well that distributed in the reservoir with a horizontal extent of around 1-10 miles and 2-2000 feet in depth. Because the chemical and physical measurement are digital, satellite communications technology can be utilized to bridge the distance between people and data. Reservoir data can be centralized to allow an oil and/or gas company and its clients to monitor and analyze underbalanced drilling projects without traveling to the wellsite. This technology can reduce risk, cut the amount of time needed for carrying out exploratory operations, and reduce the size of a reporting system placed in a wellsite down-hole.

DESCRIPTION OF BEST MODES OF THE INVENTION

Figure 1:
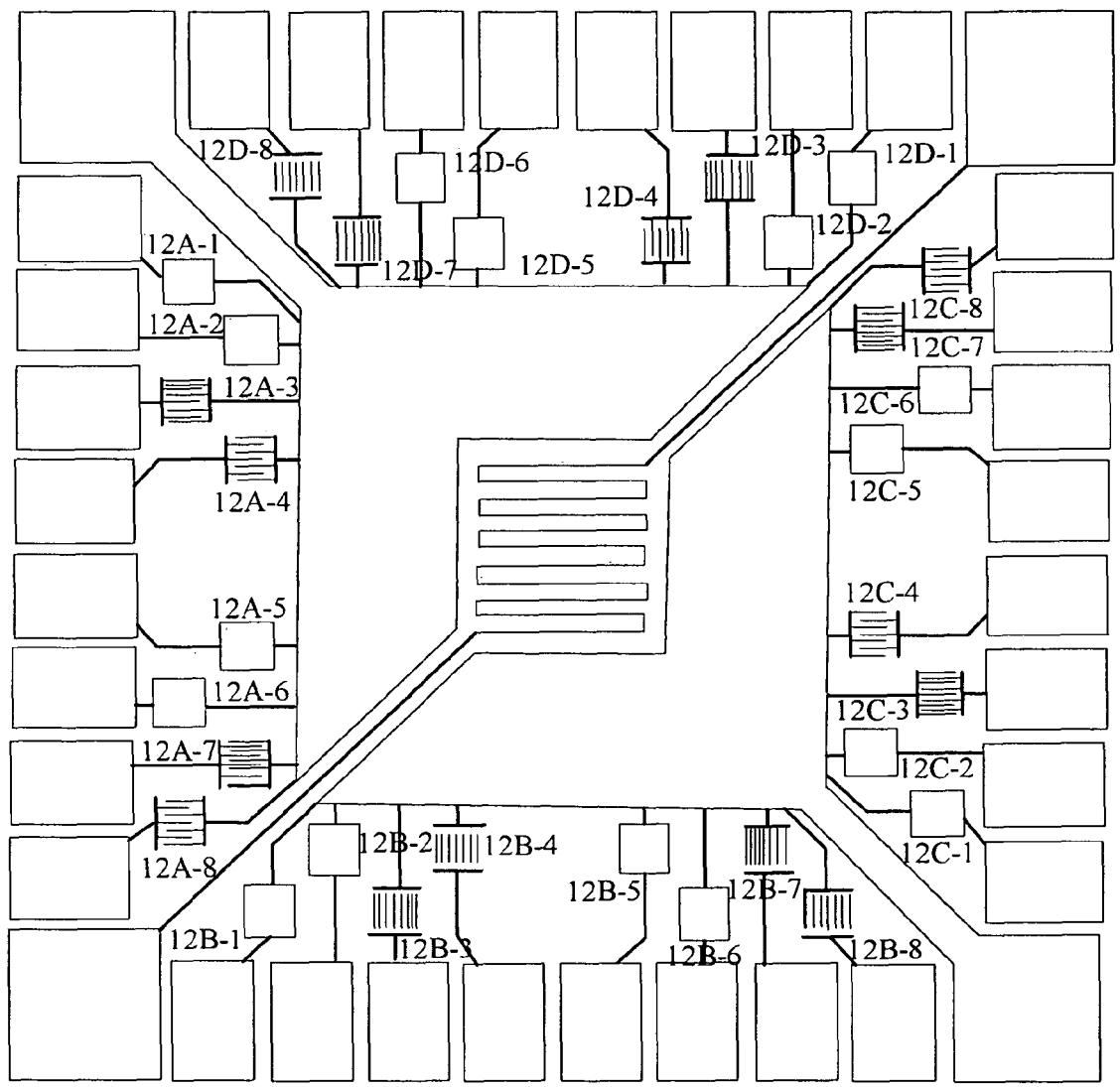
FIG. 1 illustrates an array of nanosensors, each using a network of SWCNTs to connect two electrodes according to an embodiment of the invention.

FIG. 1 illustrates a nanosensor 11, constructed according to an embodiment of the invention, including 32 interdigitated electrode fingers ("IDEFs"), 12A-1 through 12D-8, connected to first and second voltage sources, with a controllable voltage difference. In FIG. 1, a 1 cm×1 cm chip with Q sensing elements and SWCNTs bridging the gaps between adjacent IDEFs (Q=2-32). Each IDE is fabricated using conventional photolithography with a nominal finger width of 10 μm and gap sizes d=8, 12, 25 and 50 μm, or any other desired set of gap sizes. The fingers and contact pads are thermally evaporated Ti (20 nm thickness) and Pt (200 nm thickness) on a layer of $SiO_2$, thermally grown on a silicon substrate. The sensing material is bulk-produced SWCNTs from a HiPCo process (Rice University.), purified to remove amorphous carbon and metal impurities according to a procedure described in the literature. The purified SWCNTs are dispersed in a selected solvent, such as dimethyl formamide, to create a suspension of SWCNTs. The suspension is sonicated, then drop-deposited onto the interdigitated area of the electrodes. After the solvent evaporates, the SWCNTs forms a network connecting two adjacent IDEFs with a corresponding voltage difference. Any residue of the solvent was thoroughly removed by drying the sensor under vacuum. The SWCNT density in the network can be varied by varying the amount of suspension or the concentration of SWCNTs in the suspension placed on the sensor area. This process produces a statistically meaningful number of SWCNTs bridging the gap between two terminals to give reproducible performance. Alternatively, the SWCNTs can be grown directly on the electrodes using chemical vapor deposition. A selected electrical parameter response value, such as conductance or resistivity or electrical current or voltage difference, is provided or measured for the uncoated and coated SWCNT networks. Differences between the sensing elements are compensated for by varying a base resistance located in series with each element.

SWCNTs yield different signal responses when exposed to different fluids and vapors, and one must use pattern recognition or intelligent signal processing techniques for the identification of the fluid constituent of interest. SWCNTs do not respond to exposure to certain fluids and vapors, and in those cases, coating or doping of the nanotubes may elicit a signal.

In one version of the system shown in FIG. 1, eight of the IDEFs (12A-1 through 12A-8) are doped with mono-layer protected clusters ("MPCs") of Au, eight of the IDEFs (12B-1 through 12B-8) are coated with hydroxypropyl cellulose, and sixteen of the IDEFs (12C-1 through 12D-8) are "bare" CNTs. In another version, each IDEF, or subsets including more than one IDEF, is coated or doped with a (different) selected coating or dopant material so that the presence (or absence) of up to 31 or 32 different target materials can be tested. A group of IDEFs, including a single IDEF, can be used to test for a given environmental parameter value (e.g., relative humidity, temperature, fluid pressure, fluid movement). Alternatively, a value for each of a selected group of environmental parameters can be determined, using an assembly of IDEFs illustrated in FIG. 1.

In some initial tests, the electrical current (response value) through the sensors, at a constant voltage of 1 Volt, was monitored as different concentrations of chemicals, such as chlorine ($Cl_2$) and of hydrochloric acid (HCl) vapor were introduced to the sensor's environment. A voltage difference of less than 1 Volt (or greater, if desired) can be used here. A computerized fluid blending and dilution system, Environics 2040 (Environics, Inc. Tolland, Conn.), was used to create different concentration streams with a steady flow of 400 cc/min during both exposure and purge periods.

The electrical signal (current) was collected using a semiconductor parameter analyzer HP4155B (Agilent, Palo Alto, Calif.). Other equivalent electrical parameters, such as conductance or resistance, can be used as response values. In trials involving heating, a thermal controller, Micro-Infinity ICN77000 Series Controller (Newport Electronics, Inc., Santa Ana, Calif.) with a thermocouple, maintained a constant temperature for the sensor operation. Additionally, a vacuum pump and an ultraviolet lamp of wavelength 254 nm were employed on occasion to accelerate the recovery of the sensors between tests; other ultraviolet wavelengths, such as 300 nm and 360 nm, can also be used to accelerate recovery, but are less effective than the 254 nm wavelength.

Carbon nanotubes do-not sense presence of some fluids and vapors, due to the chemical and physical properties of CNTs as well as the nature of interaction between the fluid molecules and nanotubes. SWCNTs have been found to detect presence of $NH_3$ and/or $NO_2$, based on the charge transfer between these fluids and SWCNTs. Early tests indicated that pristine SWCNTs do not respond at all when exposed to some industrial chemicals, such as chlorine, hydrogen chloride and methane. It is important to get some observable response before one can do signal processing or pattern recognition for selective identification.

Carbon nanotubes coated with different polymers, such as chlorosulfonated polyethylene, hydroxypropyl cellulose, polystyrene, polyvinylalcohol, etc. used in commercial polymer based chemical sensors available for organic vapor detection, can provide specific interactions with a chemical species of interest. As this chemical treatment aims to provide a specific interaction between the carbon nanotube matrix and specific gas molecules, the treatment can improve the selectivity while maintaining the high sensitivity expected of a nanosensor.

Figures 2A, 2B:
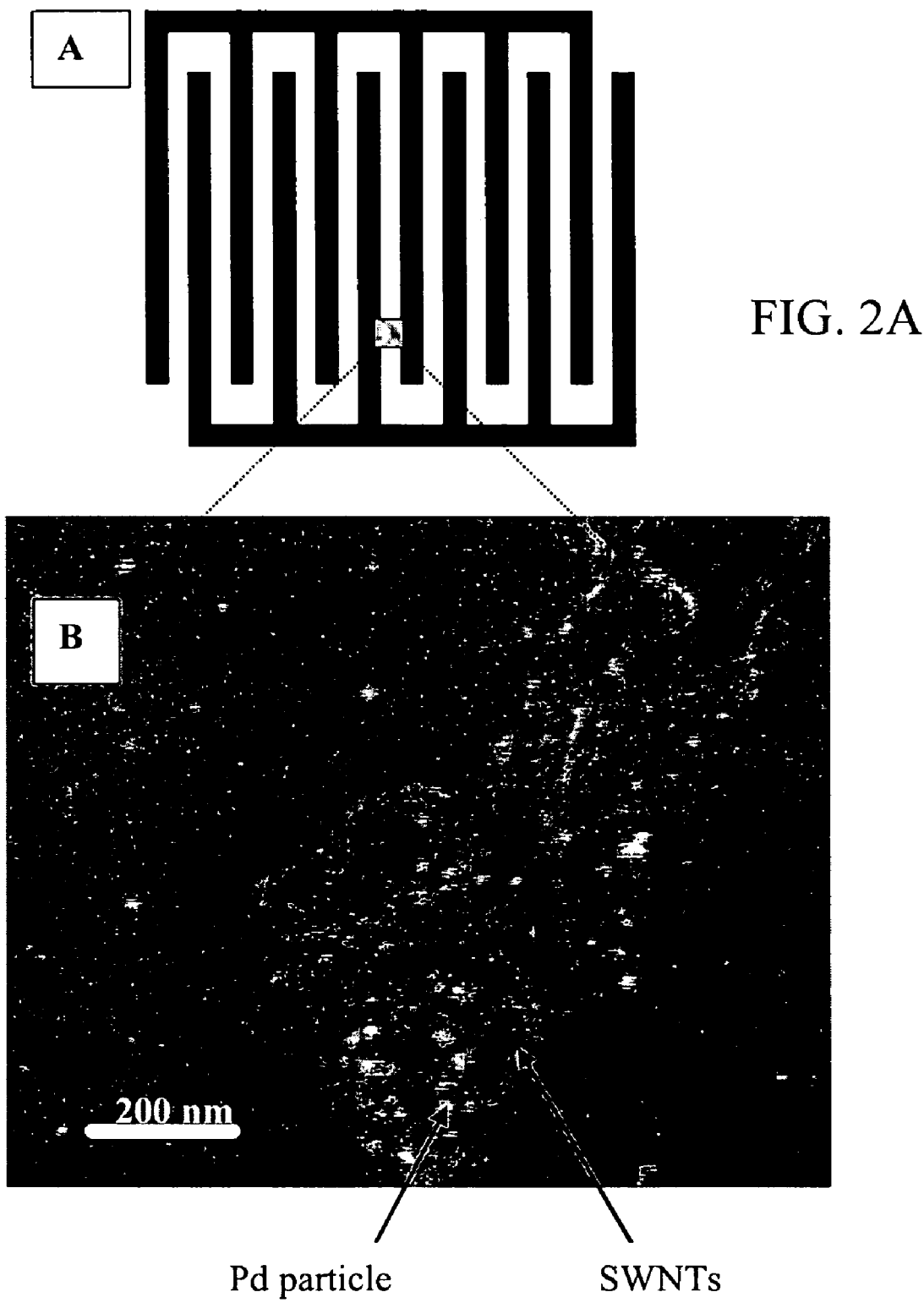
FIGS. 2A and 2B illustrate an interdigitated electrode (IDE) array (2A) and an SEM image of a Pd-loaded section of the IDE according to an embodiment.

FIG. 2A is a schematic view of an IDE, used in the invention, in which An assembly of SWCNTs, for example, is loaded with Pd (or another transition element, such as Pt, Ru, Rh, Ir, Os, Au, Ag and/or Hg) by sputter coating onto a pile of CNTs. The CNTs are then drop deposited onto the fingers in FIG. 2A and dried to create a sensor with CNT diameters of about 10 nm and an initial resistance in a range of 0.2-1 kilo-Ohm. FIG. 2B is a scanning electron microscope (SEM) image in which the relatively bright spots are Pd particles (average diameter 10 nm) and the larger and darker bulk is an assembly of SWCNTs. A constant voltage of about 1 Volt is imposed across the CNT sensors, with $CH_4$ concentrations of 6, 15, 30 or 100 ppm present to estimate the sensitivity of the IDEs in FIG. 2A to a hydrocarbon (here, $CH_4$) at room temperature. Test results exhibit an increase in current for increase in CH4 concentrations at these small values, with corresponding decrease in electrical resistance, or corresponding increase in conductance. A logarithm fit is found to most closely match the electrical properties data for most of the sensors for these small concentrations.

Figure 3:
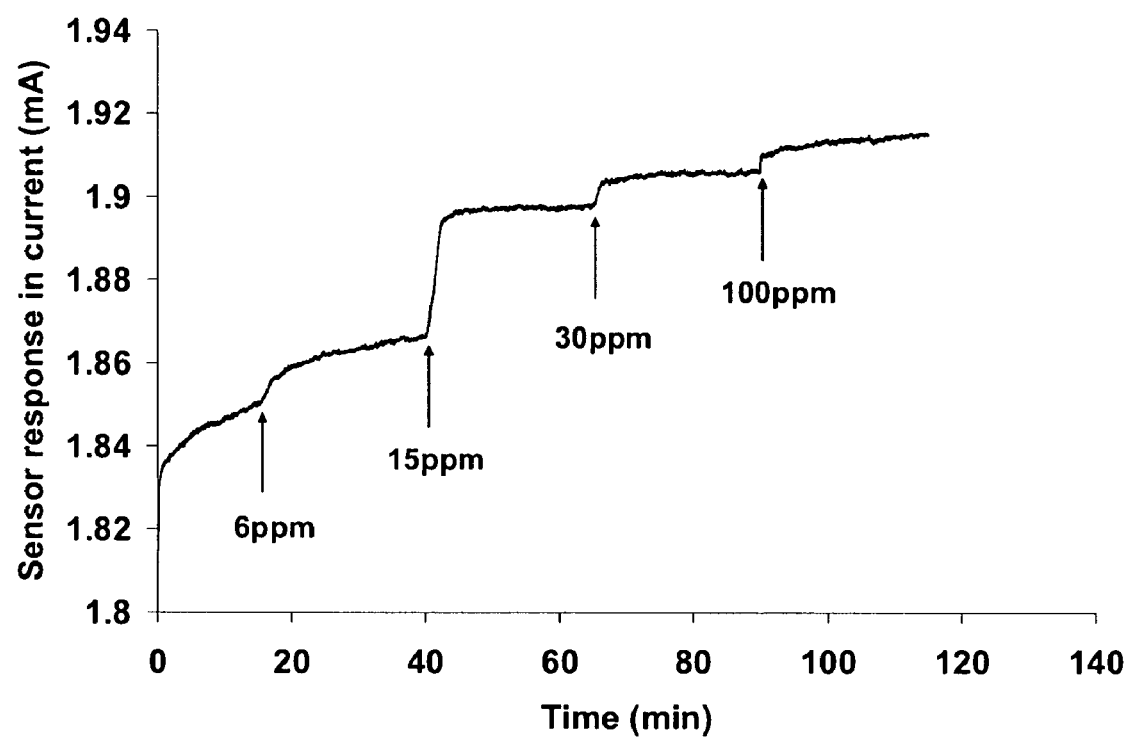
FIG. 3 graphically illustrates variation of a measured electrical parameter with time for different concentrations.

FIG. 3 graphically illustrates sensor response (current in milli-Amps) versus time for each of several $CH_4$ concentrations (6, 20, 60 and 100 ppm), and also graphically illustrates fitting of a logarithmic function, $$V/V_0 \approx a \ln(C) - b = \ln\{C^a/\exp(b)\}, \quad (1)$$

to relative response $V/V_0$ versus $CH_4$ concentration c, for different sensor networks. Resistance, as the electrical parameter, normally decreases with increasing concentration C of the constituent, while conductance, electrical current and voltage difference normally increase with increasing concentration c. The algorithm set forth in Appendix 1 and illustrated in Eqs. (A3)-(A6) can be applied to estimate concentration of one or more of the fluids $CH_4$, $C_mH_n$ and/or $CO_x$, by replacing the concentration $C_1$ or $C_2$ or $C_3 = C$ by the quantity $$x = \ln\{C^a/\exp(b)\}, \quad (2)$$

where the parameters a and b will vary with the particular gas constituent of interest.

Methane, in the presence of the SWCNT network, may form a complex such as $H[Pd].CH_3$. The H atoms in $CH_4$ tend to attract electrons from Pd, which in turn can obtain electrons from the SWCNTs to facilitate formation of the complex. This behavior should also be manifest for some or all of similar transition metals, such as Pt, Ru, Rh, Ir, Os, Au, Ag and/or Hg. The detection lower limit for $CH_4$ at room temperature, using a Pd-doped SWCNT network, is estimated to be a few hundred ppb to a few ppm. This compares with a $CH_4$ detection lower limit Of 0.5-1 percent for conventional sensors, at temperatures $T(min) \geq 450°$ C.

A coated or doped ("loaded") SWCNT array can be used to estimate one or more values of a group of environmental parameter EP, including local relative humidity (RH), local temperature (T), local pressure (p), direction and velocity of fluid movement (represented by a current vector J) and/or presence/absence of a target molecule associated with an underground reservoir of a fluid mineral, such as oil, natural gas and the like.

A comparison experiment was conducted on sensors using pure, unloaded SWCNTs exposed to different gas analytes, with results shown in FIG. 3. The pure or unloaded SWCNT sensors showed no observable response to exposure when exposed to $Cl_2$ or to HCl, but displayed positive response signals, varying monotonically with concentration, for $NO_p$, nitrotoluene, and benzene, and showed a negative monotonic response signal (opposite polarity) for $NH_3$. Thus, the SWCNT sensor has some low level of discriminating power by itself for exposure to some, but not all, gases. It is clear from FIG. 4 that SWCNTs sensors are sensitive to $NO_p$, nitrotoluene, benzene and $NH_3$, as demonstrated previously. The opposite polarities of sensor responses for $NO_p$ and for $NH_3$ are believed to be due to the electron-acceptance and electron-donation characteristics of these fluids. In relative terms, SWCNT sensors have lower sensitivity to benzene and to nitrotoluene vapors than to $NO_p$.

Figure 4A:
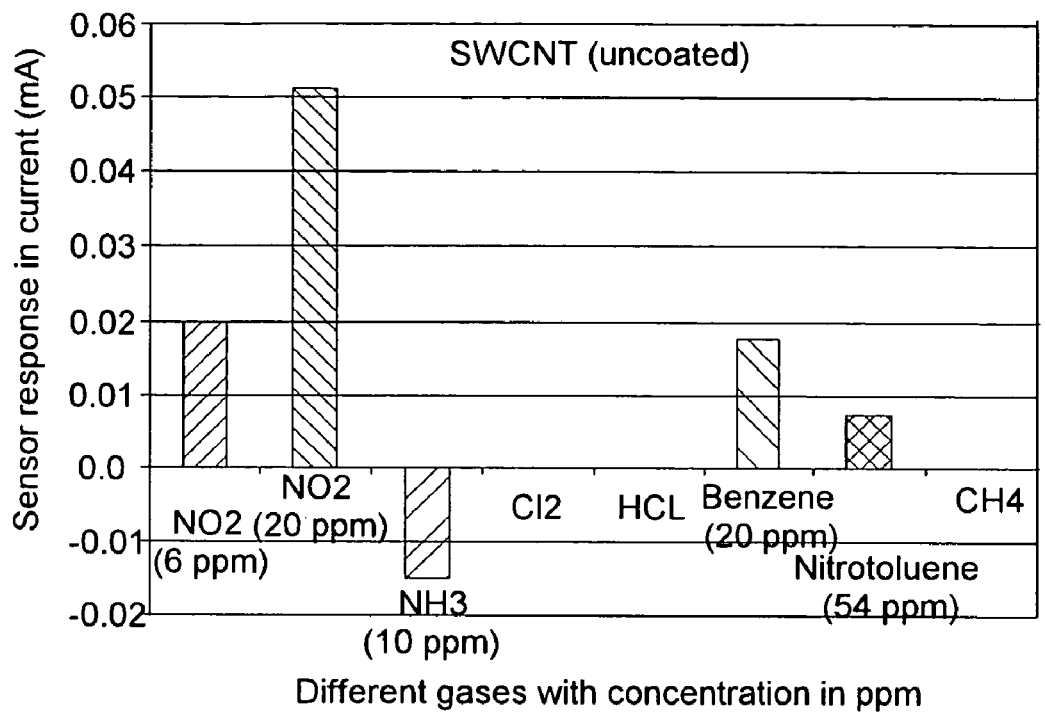
FIGS. 4A and 4B compare relative response of SWCNTs coated with chlorosulfonated polyethylene or with hydroxypropyl cellulose for presence of $NO_2$, $Cl_2$, HCl, and $CH_4$.
Figure 4B:
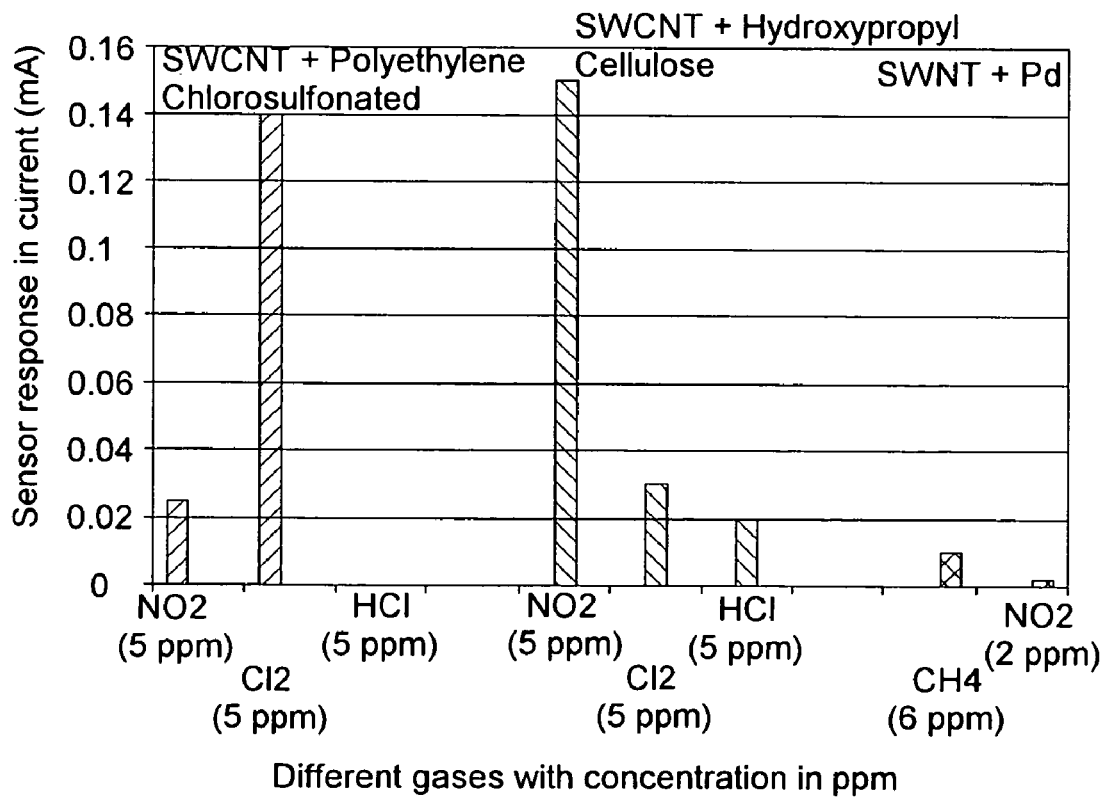

A similar comparison experiment was carried out on the polymer-coated SWCNT sensors exposed to different analytes, with results shown in FIG. 4. It is clear that addition of chlorosulfonated polyethylene coating to SWCNTs increases the sensitivity dramatically for exposure to 5 ppm $Cl_2$ compared to the pure SWCNT sensor, which shows no observable response even at 50 ppm of $Cl_2$ concentration. Although there is a signal for $NO_2$ from a chlorosulfonated polyethylene-coated SWCNT sensor, the sensing signal ratio of $Cl_2$ to $NO_2$ is much larger than 1. Therefore, this polymer-coated sensor can be used in a sensor array to give a distinct response signal for $Cl_2$ (and, similarly, for HCl) for discrimination between chemicals.

These studies also show that both pure (unloaded) SWCNTs and chlorosulfonated polyethylene-coated SWCNTs do not respond to concentrations of up to 100 ppm HCl fluid in nitrogen. Higher concentrations of HCl were not tested as these high levels are not of interest for a nanosensor. In contrast, hydroxypropyl cellulose-coated SWCNTs respond to presence of HCl, but this sensor is also sensitive to $NO_2$. Presence of the OH groups in the polymer coating may be responsible for the response signal differences in interaction with acidic fluids. Because this sensor gives a significant response to HCl where other SWCNT sensors do not, the hydroxypropyl cellulose sensor can be used in a sensor array to provide a chemical signature that differentiates the HCl fluid from other chemicals.

We have demonstrated a simple nano-chemical sensor using polymer-coated SWCNTs as the sensing medium. Because pristine (unloaded) nanotubes do not respond observably to some chemicals of interest, it is important to explore coating or doping techniques to promote observable responses so that a broad application coverage can be ensured. We have found that the polymer coating enables selective sensing of, and discrimination between, chlorine and hydrochloric acid vapor at a sensitivity level of 5 ppm and above. It is important to recognize that coating or doping alone is unlikely to provide absolute discrimination. It is recommended that the two types of loadings be used together. As with most sensors of any size or exploiting any property change, pattern recognition techniques are a valuable and necessary complement to provide discrimination. In that regard, the use of sensor arrays with multiple elements is an effective approach to chemical sensing, wherein the data from multiple sensors can be routed to a signal processing chip, integrated into the system, for data fusion and analysis. Advanced signal processing and pattern recognition techniques can be used to confirm (or refute) the assumed presence of a given species, in addition to the help from the selective coatings. Sequential use of multiple sensing element arrays offers additional operational freedom, when sensor recovery is slow and is a rate limiting process. Under such circumstances, a sensor would always be available while other sensors are in recovery mode.

Figure 5:
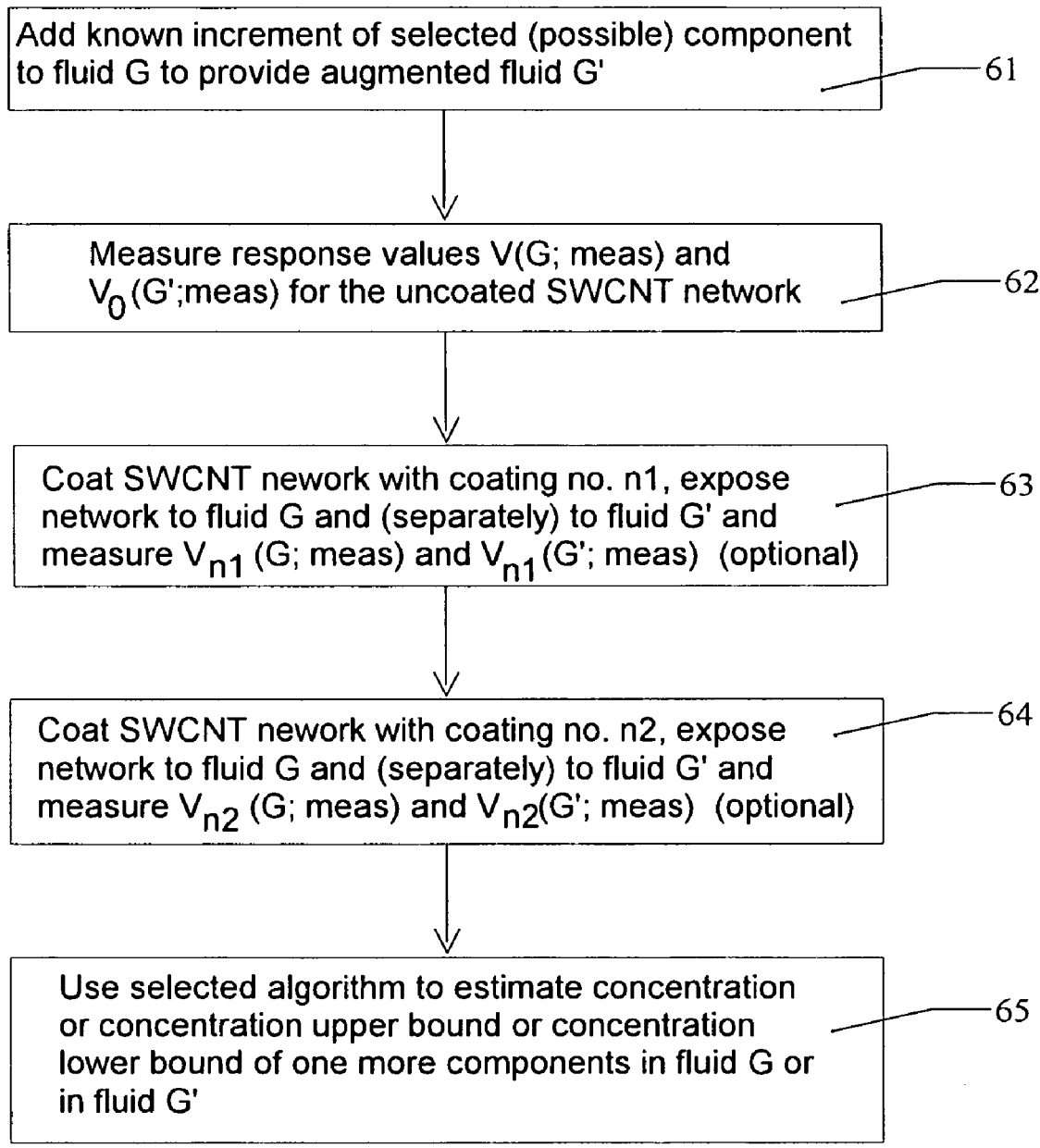
FIG. 5 is a flow chart for practicing the invention using one or more selected coatings and dopants (e.g., Pd) to detect presence of hydrocarbons.

Using the results shown in FIG. 4, a procedure, shown as a flow chart in FIG. 5, can be implemented to detect presence of one, two or more target molecules, such as halogens, $C_mH_n$ and/or an oxygen-containing compound (alcohol, ketone, aldehyde, etc.) $C_mH_pO_q$ in an unknown fluid G (which may contain $NO_2$, $NH_3$ and one or more of the target fluid molecules). In step 51, a known increment of a selected (possible) component of the fluid G (reference component, such as $NO_2$ or $NH_3$, or target component, such as $CH_4$ or $C_2H_6$) is added to and mixed with a portion of the fluid G to provide an augmented fluid G'. In step 52, response values, $V_0$(G;meas) and $V_0$(G';meas); are measured for the uncoated SWCNT sensor In step 53, the SWCNT network is loaded (coated or doped) with a selected coating or dopant no. n1 (e.g., Pd, Pt, Rh, Ir, Ru, Os, Au, Ag and/or Hg), is exposed to the fluid G and (separately) to the fluid G', and the corresponding response values $V_{n1}$(G;meas) and $V_{n1}$(G';meas) are measured or otherwise provided. In step 54, the SWCNT sensor is loaded (instead) with a different selected coating or dopant no. n2, is exposed to the fluid G and (separately) to the fluid G', and the corresponding response values, $V_{n2}$(G;meas) and $V_{n2}$(G';meas) are measured or otherwise provided. In step 55, the system uses a selected algorithm to estimate the concentration (e.g., in ppb), or concentration upper bound or concentration lower bound, of one or more of the components believed to be present in the fluid G (or in the fluid G'). Two suitable algorithms for determination of fluid component concentration are disclosed in flow charts in FIGS. 6 and 7, discussed in Appendices A and B, respectively.

It is assumed initially in Appendix A that (i) the response value difference varies substantially linearly, over a suitable concentration range, with concentration difference of a single constituent that is present and (ii) the response value difference, in the presence of two or more fluid constituents in the fluid G, is the sum of the response value differences of the single constituent fluids. Linear response coefficients $a_{i,j}$ for the response value differences are assumed to be determined experimentally or otherwise provided. As an example, assume that one reference fluid (e.g., $NO_2$ or $NH_3$) plus first and second target fluids (e.g., $CH_4$ and $C_2H_6$), are suspected to be present in the fluid G. Estimates of each of the concentration values $c_{m0}$ for the initial (unaugmented) fluid G are obtained from inversion of an M×M matrix equation relating these concentration values to response value differences for N coatings, where M ($\geq 2$) is the number of fluid components (reference and target) believed to be present and N ($\geq 1$) is the number of loadings (coatings or dopants) used for the measurements.

Figure 6:
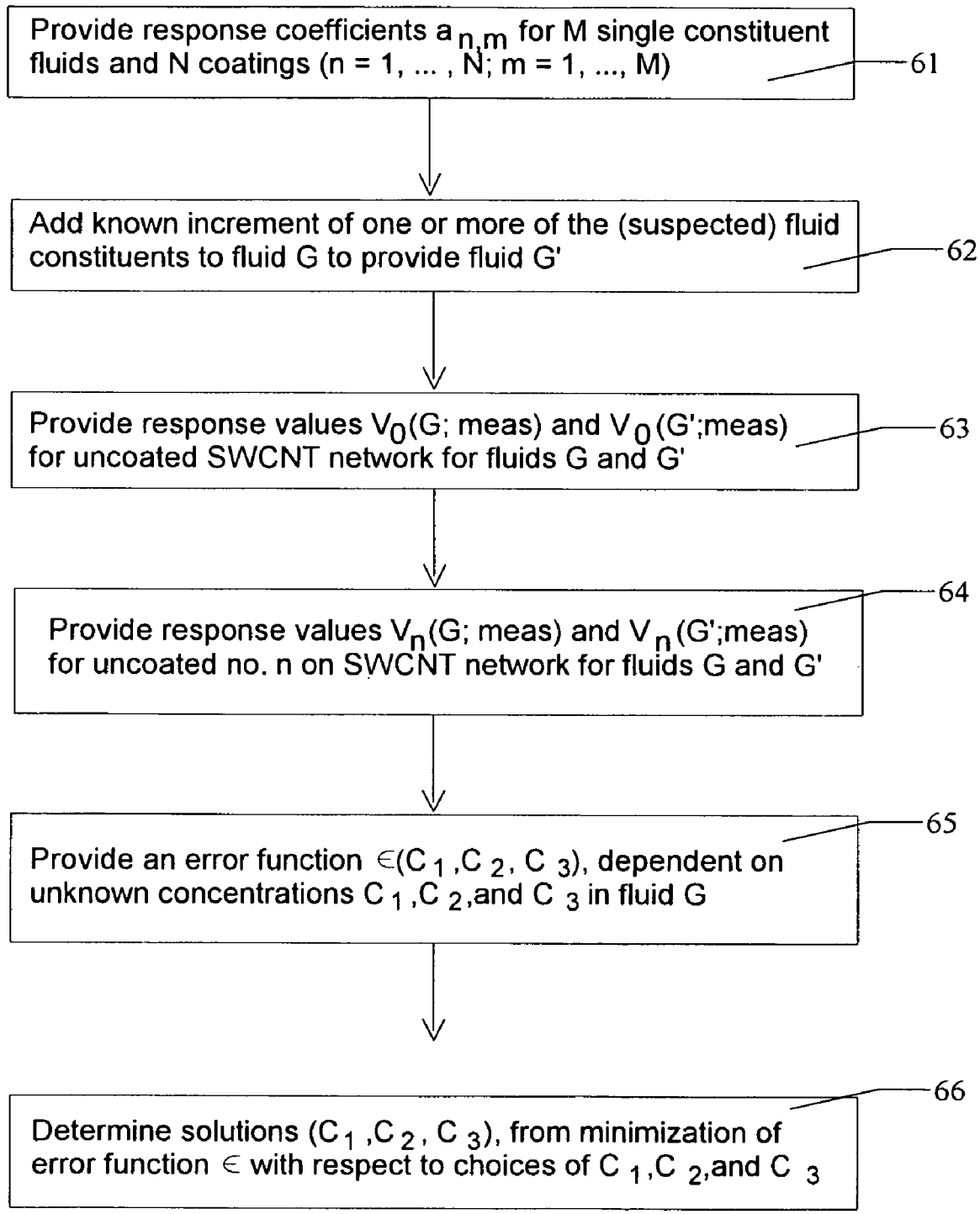
FIGS. 6 and 7 are flow charts of algorithms for estimation of concentrations of fluid components and for determination of presence of a particular fluid component, where a coated or doped SWCNT network is used.

The approach discussed in Appendix A, and illustrated in FIG. 6, allows separate weights, $w_n$ and $w'_n$ (or the same weight), to be assigned to the measurements of the initial fluid and augmented fluid. Preferably, at least two of the weight values in Eq. (3) are positive (e.g., ($w_1$, $w_2$) or ($w'_1$, $w'_2$) or ($w_1$, $w'_2$) or ($w'_1$, $w_2$)) for the example with N=2, and the relative sizes of the non-zero weights reflect the relative importance of the response measurements. If, as is likely, the four response measurements are believed to be equally important, one can choose $w_1=w_2=w'_1=w'_2=1$. One can ignore one or two of the four measurements, in which event the corresponding weight value(s) is set equal to 0.

The response coefficients $a_{i,j}$ used in Eqs. (A1) and (A2) are not necessarily positive. For example, the response coefficient $a_{i,j}$ for the fluid constituent $CH_4$ is positive for several of the SWCNT coatings used, while the response coefficient for $NH_3$ is observed to be negative for some of these coatings.

Figure 7:
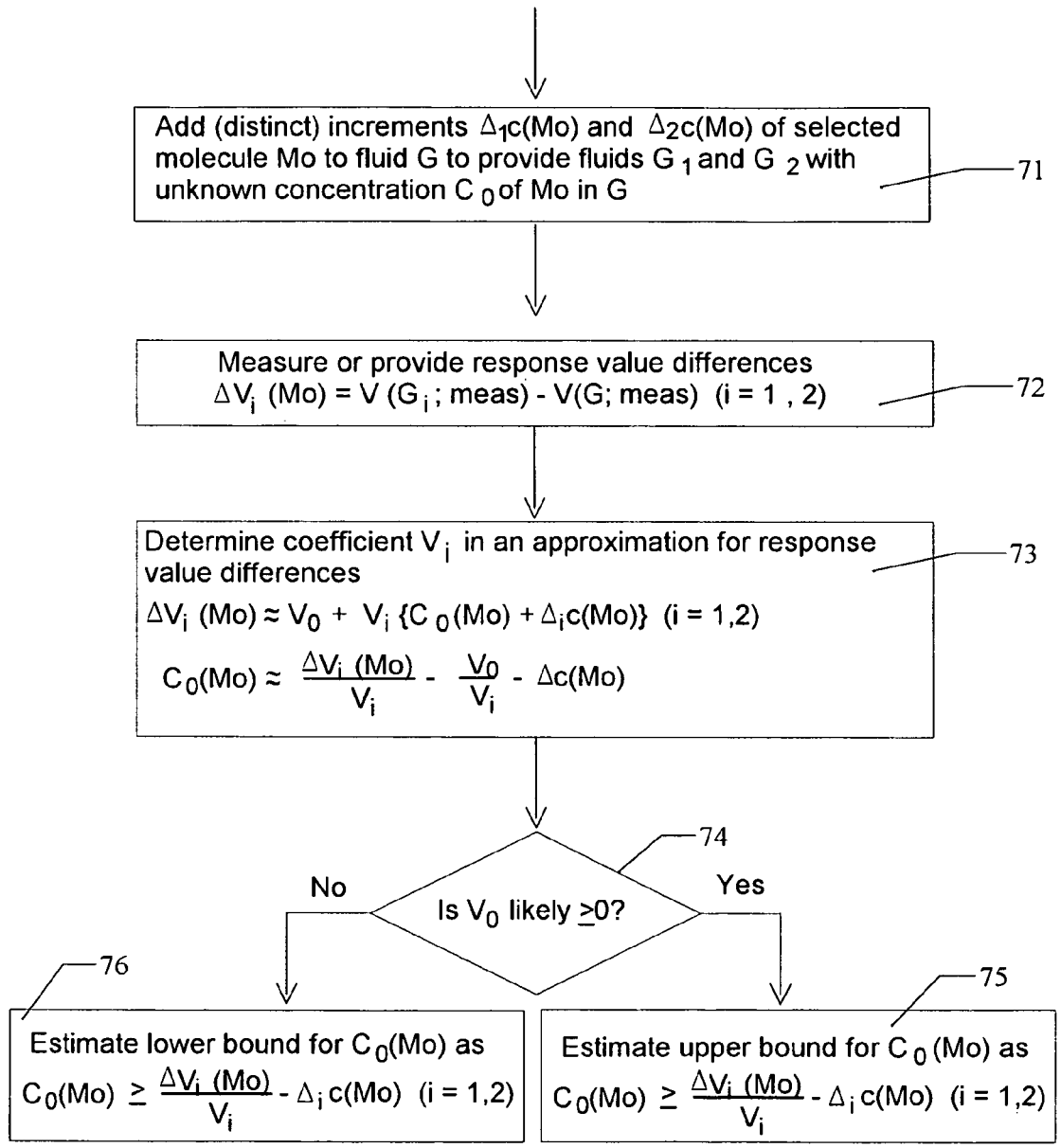

Appendix B, and the corresponding flow chart in FIG. 7, discuss an approach for estimating an upper bound, or a lower bound, of a concentration value of a selected molecule (e.g., $C_mH_n$ and/or $C_mH_pO_q$), again assuming that a response value difference varies substantially linearly with a concentration value difference of the selected molecule. This bound is computed separately for each selected molecule. Appendices A and B apply to loaded (coated or doped CNT networks.

Figure 8:
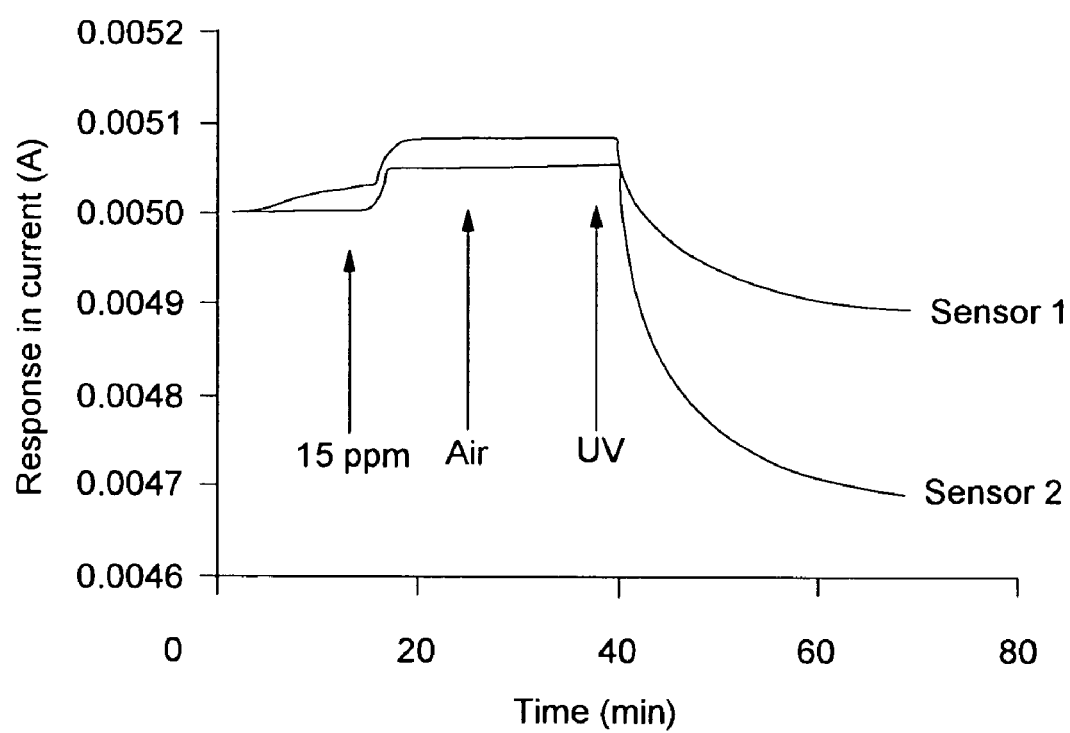
FIG. 8 graphically illustrates recovery time of a measured electrical parameter (here, current) to presence of ultraviolet light.

Exposure of the coated SWCNT network to ultraviolet light can reduce the recovery time (normally ten hours or more) required to return the network to a substantially uncoated condition, by promoting accelerated detachment of the coating material from the SWCNT network. FIG. 8 graphically illustrates measured response to absorption of $CH_4$ versus time with exposure to ultraviolet light for two different amounts of the same coating (sensors 1 and 2), indicating the improvement in recovery time where ultraviolet light is applied to lower the energy barrier to desorption of the adsorbed chemical from the SWCNT network. The chemical and environmental time histories may cause the response curves for the same sensor to differ.

For some relatively small molecules, such as methane ($CH_4$), ethane ($C_4H_6$), other hydrocarbons, and oxides of carbon ($CO_x$; x=1-2), an SWCNT network, doped with a transition element ("TE",) such as Pd, Pt, Rh, Ir, Ru, Os, Au, Ag and Hg, is used to detect presence of these molecules by detecting a change in an electrical parameter (conductance, resistance, current or voltage difference) or response value associated with a path defined by an SWCNT network, which extends between two electrodes having a controllable voltage difference or current. Some molecules, including nitrotoluene and phenol, are relatively strong electron donors and/or electron acceptors, and these molecules' presence can be readily detected using "bare" or unmodified SWCNTs. Other molecules, including but not limited to methane, other hydrocarbons and carbon oxides, manifest little or no electron donor or electron acceptor action so that monitoring an electrical parameter value V of an unmodified or "bare" SWCNT network will not, by itself, indicate presence or absence of these molecules.

Where $CH_4$ is adsorbed in a SWCNT/Pd matrix, the combination forms a weakly bound complex, such as $Pd^\delta(CH_4)^{-\delta}$, where $\delta$ is a relatively small positive number that need not be an integer. Methane, other hydrocarbons and carbon oxides are "greenhouse" gases and require detection capabilities in the ppb-ppm range to have much utility in environmental monitoring. The sensing platform is similar to that illustrated in FIG. 1, where the SWCNT/TE compound serves as a current or voltage modifier whose electrical parameter value V changes when molecules of a selected target chemical, such as $CH_4$ or $C_mH_n$ or $CO_x$, are adsorbed on the SWCNT/TE compound, and the magnitude of the value V is monotonically increasing (not necessarily linearly) with increase in the amount of the target chemical present. This approach for detecting presence of a target molecule is often at least one order of magnitude more sensitive at room temperature than is detection using catalytic beads or metal oxides, in part due to (1) nanoscale-induced charge transfer between TE-loaded nanotubes and $CH_4$ molecules and (2) a relatively large surface area per unit volume for SWCNTs, which permits enhanced adsorption of hydrocarbon molecules (e.g., $CH_4$ and $C_mH_n$).

Fabrication of a sensing platform for the SWCNT/TE network begins with sputter coating of about 10 nm thick Pd (or another suitable TE) onto a pile of SWCNT powder. The TE-loaded SWCNTs are then dispersed into distilled, deionized water (e.g., 0.1 mg of SWCNT/Pd in 10 ml of the water). This solution is then sonicated and drop deposited onto interdigitated electrode fingers to create an electrical sensor with an initial resistance in a range of about 0.2-1 kilo-Ohm. Current through the network, with a 1 Volt difference, was monitored where 6, 15, 30 and 100 ppm of $CH_4$ was present, using a fluid stream flow of about 400 cc/min, during exposure and during purge. Apart from preparation of the doped or loaded SWCNT network (as distinguished from coating a SWCNT network), the procedure for estimation of constituents present in a fluid using a doped SWCNT network, is parallel to the procedure using a coated SWCNT network set forth in the FIG. 5 flow chart.

Vacuum pumping and exposure of the network to ultraviolet light ($\lambda$=254 nm) are used to reduce the recovery time of the SWCNT/Pd (i.e., removal of the $CH_4$) between tests (no recovery, if these recovery acceleration procedures are not implemented). FIG. 8 graphically illustrates measured response for $CH_4$ versus time with ultraviolet light present, indicating the improvement in recovery time where ultraviolet light is applied to lower the energy barrier to desorption of $CH_4$ molecules from the SWCNT/Pd network.

Figure 9:
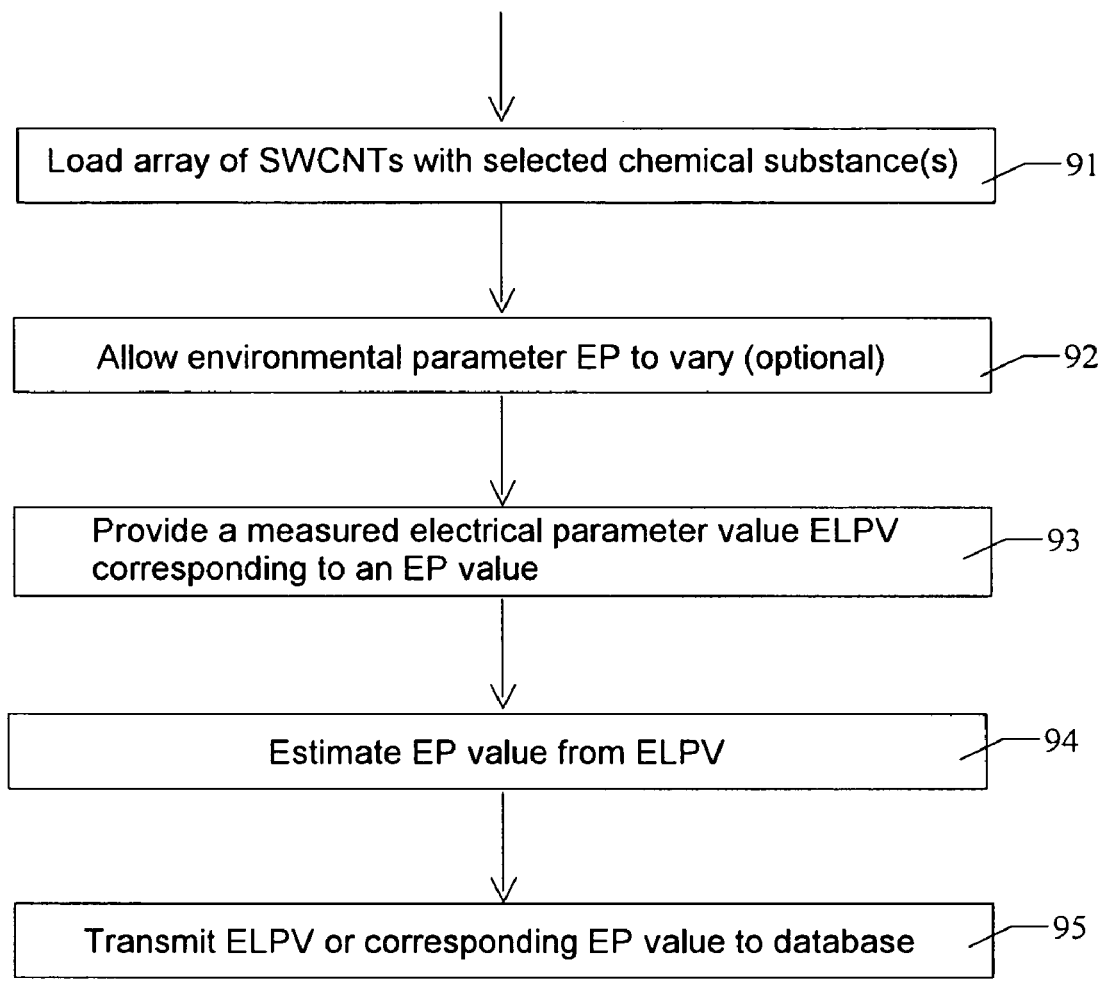
FIG. 9 is a flow chart of a procedure for practicing the invention.

FIG. 9 is a flow chart illustrating a procedure for practicing an embodiment of this invention. In step 91, an array of one or more SWCNTs is loaded (coated or doped) with one or more selected chemical substances, chosen so that an electrical parameter value (ELPV), measured along at least one loaded SWCNT, varies monotonically with variation of a value of a corresponding selected environmental parameter EP. In step 92 (optional), the value of the EP is allowed to vary. In step 93, a measured electrical parameter value ELPV is provided corresponding to the value of the EP. In step 94, the EP value, corresponding to the ELPV provided, is measured or estimated. In step 95 (optional), the ELPV and/or corresponding EP value is transmitted.

Figure 10:
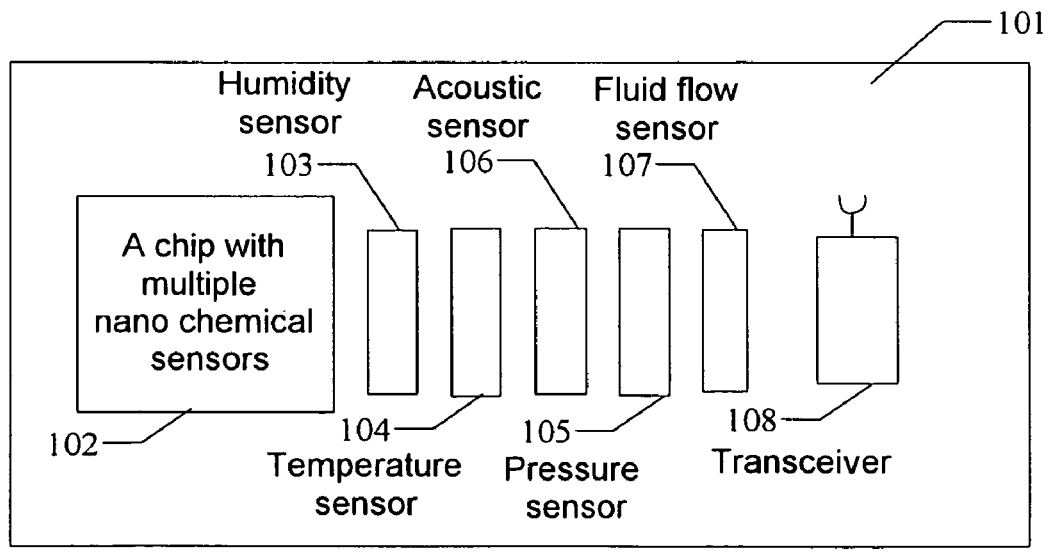
FIGS. 10 and 11 schematically represent systems for practicing the invention.

The EP may be one or more of relative humidity, temperature, fluid pressure, fluid level (for a liquid), direction and rate of fluid flow (represented by a fluid current vector J) and/or presence/absence of one or more target molecules in the fluid. FIG. 10 schematically illustrates a chip system 101 that can be used to practice the invention. The apparatus includes one or more of: a chip 102 configured with one or more nanosensors to sense the presence/absence of one or more target molecules; a relative humidity sensor 103 to sense local humidity; a temperature sensor 104 to sense local temperature; a pressure sensor 105 to sense local pressure; an acoustic sensor 106 to sense fluid level (for a liquid) adjacent to the sensor; a fluid flow sensor 107 to sense direction and rate of fluid flow (represented by a current vector J); and a wireless (or hard wired) transmitter or transceiver 108 (optional) to transmit sensor data to a database. One or more of the systems 101 is positioned in each producing horizon of a fluid mineral.

Where the mineral is oil or another mineral-containing liquid, steam or water or another inert liquid substance can be injected at a mineral-producing horizon (a vertical or depth range within which the mineral is located, isolated from any adjacent producing horizon) to move or displace the mineral and/or to provide additional pressure to bring the mineral to the surface for recovery. A fluid flow sensor can sense the direction and velocity of movement of the mineral, for purposes of monitoring the effectiveness of the steam pressurization. If, for example, the liquid mineral is not moving in an appropriate direction, the origin of the steam pressurization can be changed.

Figure 11:
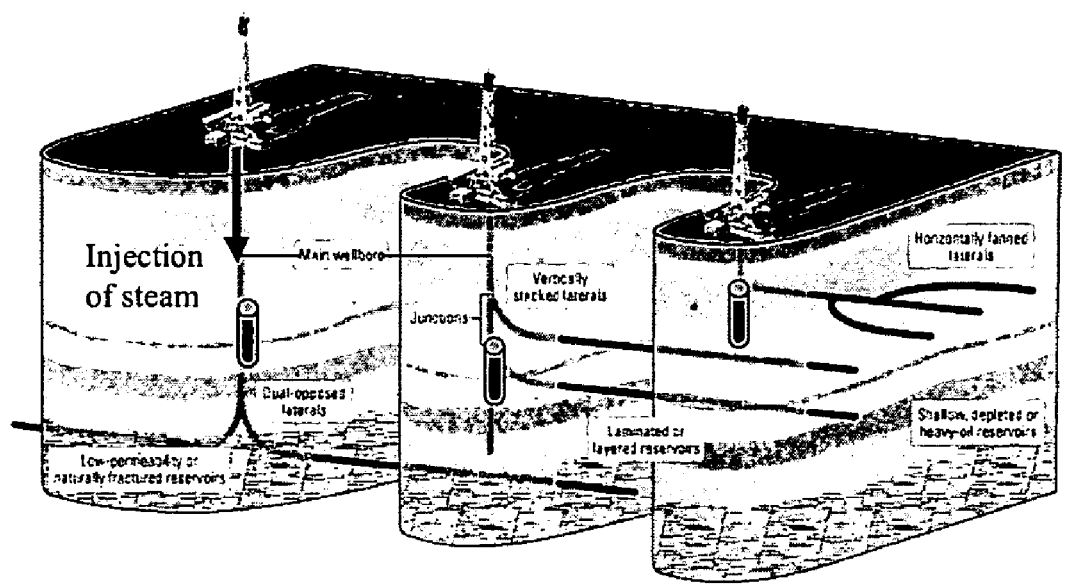

FIG. 11 schematically illustrates injection of steam or another relatively inert fluid into a reservoir R, or a suspected reservoir, to estimate relevant physical and chemical content of the reservoir and movement of a mineral-containing fluid in response to this injection. One or more sensor chips 102 (FIG. 10) is positioned in a mineral producing horizon H to sense one or more of chemical composition, relative humidity, fluid temperature, fluid pressure, fluid flow direction, and estimated amount or concentration of mineral present adjacent to the chip 102. A transceiver 108, positioned on or associated with the chip 102 in FIG. 10, transmits signals representing measurements made by the sensors. Preferably, a network of such chips provides sensor information that can be correlated between adjacent chips so that, for example, a fluid flow or velocity pattern can be estimated for relevant parts of the reservoir R. This flow pattern can be estimated for horizontal movement (only) of the fluid or for combined horizontal and vertical movement.

Figure 12:
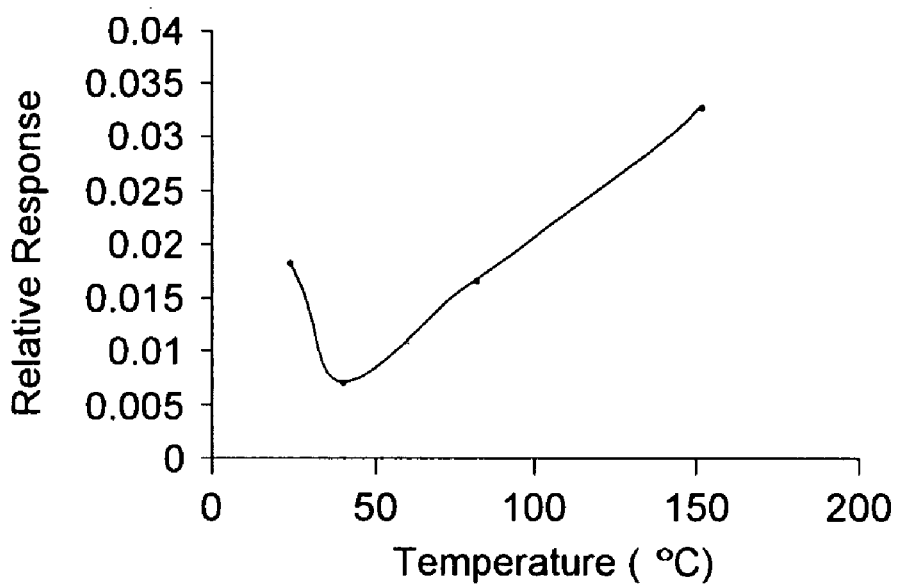
FIGS. 12 and 13 graphically illustrate behavior of a measured electrical parameter and response time with varying temperature T.
Figure 13:
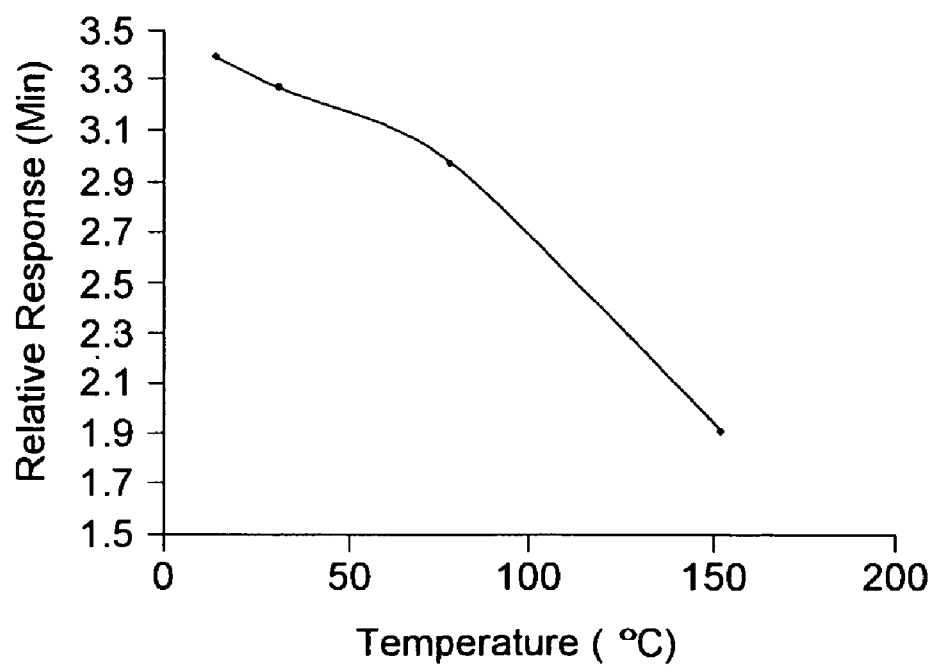

FIGS. 12 and 13 graphically illustrate the environmental effects of varying temperature upon relative response $V/V_0$ and upon response time, respectively, for SWCNTs plus Pd. The relative response for $CH_4$ in FIG. 12 appears to reach a relative minimum at a temperature $T=T(min) \approx 40°$ C. and to increase monotonically as $|T-T(min)|$ increases. At room temperature, $T \approx 20°$ C., the relative response is approximately three times the relative response at $T=T(min)$. The response time (required for approximate equilibration of the response after exposure to a fluid containing the target molecule) decreases monotonically with increasing temperature T and increases with the amount of load (coating or dopant) used to treat the SWCNT.

Temperature can be measured using a temperature micosensor, such as a SIP Type, TD Series, available from Honeywell. This sensor should accurately measure, and preferably record, temperatures in a range from $-40°$ C. up to $150°$ C.

Gas pressure can be measured using a pressure microsensor such as a 140 Series Silicon Pressure Sensor, available from Honeywell. This sensor should accurately measure fluid pressures in a range from 0 psi to 150 psi.

The SWCNT/TE sensor, with TE=Pd, has been tested at 15 ppm and 30 ppm concentrations of $CH_4$ at temperatures of T=40° C., 80° C. and 150° C. The response parameter value (e.g., conductance or current) increases with increasing temperature, perhaps due to an enhanced catalytic effect of SWCNT/Pd binding with increasing temperature, as illustrated in FIG. 13 for $CH_4$.

Experimental results for other hydrocarbons, for $CO_x$, for alcohols, for ketones and for aldehydes are qualitatively similar to those for $CH_4$.

U.S. Pat. Nos. 6,672,163, 6,817,229, and 6,938,458, issued to Wei Han et al, disclose a system for in situ characterization of a down-hole fluid, using a comparison of transmitted and received signals that are propagated through the fluid, which may contain drilling mud and other solids, water, oil and other liquids that need to be characterized. The method uses varying frequency signals to estimate attenuation, scattering and other effects produced in a non-homogeneous liquid-solid environment. Below 22 percent (by volume) solid concentration, attenuation a varies with frequency approximately as $\alpha = Af + B$, where A and B are substantially independent of frequency f. In a pure liquid, the attenuation $\alpha = A'f^k + B'$, with $k \approx 2$. As the solid fraction increases, the exponent k decreases toward k=1. In a pure liquid, the signal propagates with attenuation a per unit length, is reflected by a solid, unmoving barrier, and returns to a receiver.

Figure 14:
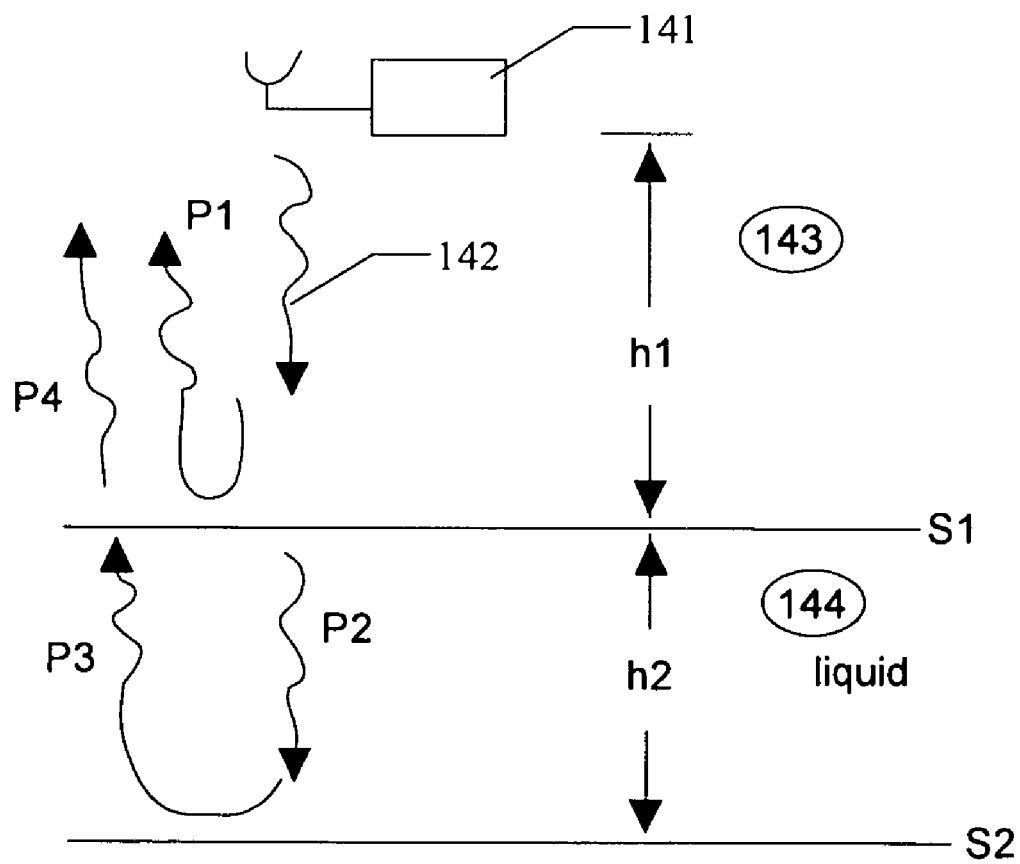
FIG. 14 illustrates a model for estimation of location of upper and lower surfaces of a liquid, such as an oil-water mixture.

Consider a model of liquid (e.g., oil) level estimation illustrated in FIG. 14, where a source-sensor 141 is located at a height h1 above an exposed (upper) surface S1 of a liquid 142 having a depth h2. An acoustic or electromagnetic signal 142 is provided by the source-sensor 141 and propagates in an ambient medium 143 to the upper surface S1. A calculable first reflection coefficient p1($f$) of the signal energy is reflected at the surface S1 and returns to, and is measured at, the source-sensor 141, with a total attenuation, p1($f$)·exp{−2α1($f$)·h1}, that is characteristic of signal propagation by a distance 2h1. Here, α1($f$) is a frequency-dependent attenuation coefficient for the ambient medium 142. By measuring the attenuation at two distinct frequencies, f=f1 and f=f2, and using known attenuation coefficients, α1(f1) and α1(f2), one can estimate the present height h1 of the source-sensor 141 above the upper surface S1 of the liquid 144. By appropriately gating in time of the initial signal produced and the return signal from the upper surface 51, the incremental signal from a portion of the propagating signal that has passed through the liquid 144 can be deleted.

A second portion (calculable refraction coefficient p2($f$)) of the initial signal passes through the upper surface S1, propagates an unknown distance h2 through the liquid 144 with a known attenuation coefficient α2($f$), and is reflected at a lower surface S2 (assumed to be planar) of the liquid 144 with a calculable reflection coefficient p3($f$), and propagates a distance h2 to the upper surface S1 of the liquid 144. A fourth portion (calculable refraction coefficient p4($f$)) of the signal passes through the upper surface S1 and propagates a distance h1 to the source-sensor 141. From well known electromagnetic signal relations at an interface between two materials at approximately 0° incidence angle, the quantities p1($f$), p2($f$), p3($f$) and p4($f$) are estimated to be $$p1(f) = \{(n2(f) - n(f))/(n2(f) + n1(f))\}^2, \quad (3A)$$

$$p2(f) = 1 - p1(f), \quad (3B)$$

$$p3(f) = \{(n3(f) - n2(f))/(n3(f) + n2(f))\}^2, \quad (3C)$$

$$p4(f) = p1(f), \quad (3D)$$

where n1($f$), n2($f$) and n3($f$) are the refractive indices of the ambient medium (wellhead space), liquid 152 and lower surface (S2) material, respectively, which are known or determinable.

The attenuated portions of the two signal components thus become $$s1 = p1 \cdot \exp\{-2\alpha1(f) \cdot h1\}, \quad (4)$$

for the portion reflected (once) at the upper surface S1, and $$s2 = p2 \cdot p3 \cdot p4 \cdot \exp\{-2\alpha1(f) \cdot h1 - 2\alpha2(f) \cdot h2\} + s1 \quad (5)$$

for the portion that passes through the upper surface S1 and through the liquid (once in each direction). The distances or depths, h1 and h2, can be determined from Eqs. (4) and (5).

The information disclosed in the Wei Han et al patents can be adapted to provide an estimate of distance h1 to an upper surface of the liquid and a representative depth h2 of the liquid for the producing horizon.

Location of the upper surface S1 in FIG. 14 can also be estimated as follows. Two or more adjacent nanosensors, attached to or associated with a drill bit or other instrument whose elevation is controllable and measurable, are lowered into the head space of the well site. An electrical property, such as conductance, is measured at a sequence of times. When the two nanosensors are in the headspace, the conductance has, a first (known) value. When the two nanosensors move past the first surface S1 and into the liquid 144 in FIG. 14, the conductance abruptly changes to a second value that is distinct from the first value. The upper surface S1 is located at the vertical height at which this abrupt change occurs. Location of the lower surface S2 would require other measurements and computations.

Figure 15:
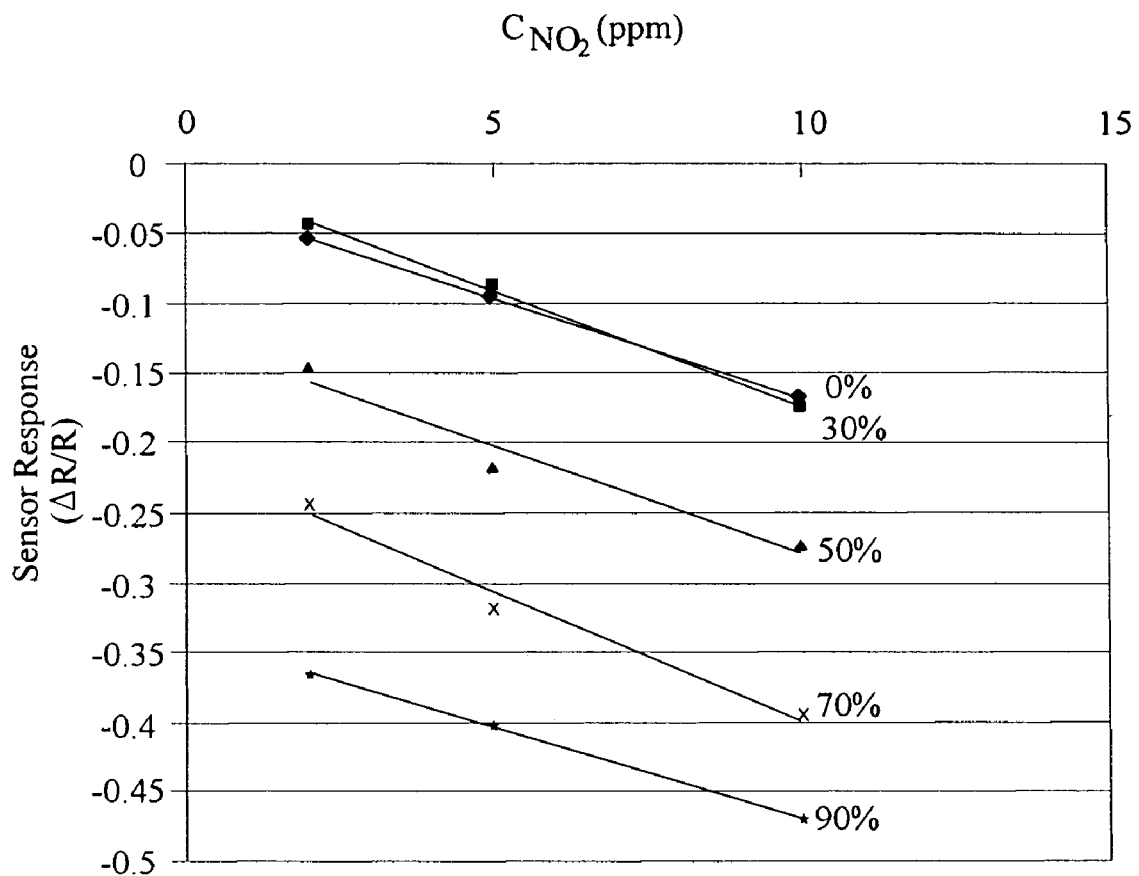
FIG. 15 graphically illustrates behavior of a measured electrical parameter $\Delta R/R_0$ for varying conc($NO_2$) with varying relative humidity RH, for a SWCNT coated with hydroxypropyl cellulose.

Effects of varying relative humidity (RH) on relative response, referenced to the response ($V_0$) at RH=0 percent, have been measured for several coating materials and doping materials, for a sequence of RH values. It is expected that relative response $V/V_0$ will decrease monotonically as the RH value increases, in part because the presence of a polar substance such as water would interfere with, and partly mask, the change ΔW in an electrical parameter, for substantially all coating and dopant materials of interest. This expectation is borne out in measurements of $\Delta R/R_0$, at $T = T_0 = 23°$ C., presented graphically in FIG. 15, for varying conc($NO_2$) with the coating material hydroxypropyl cellulose, applied to a SWCNT, for RH=0, 15, 30, 50, 70 and 90 percent.

More generally, the curves for relative response $V/V_0$ can be approximated or estimated by a parametrized curve (FIG. 16), such as $$V/V_0(RH; T_0) = F_e((RH/RH_0)^m; a) \approx a \cdot \text{sech}\{(RH/RH_0)^m\} + (1-a) \quad (6)$$

where $RH_0$ is a reference RH value, m is a positive number and $0 < a \leq 1$, each value being chosen for the particular loading material (coating or dopant) of interest. For sufficiently small values of the quantity $RH/RH_0$, the parametrized curve in Eq. (6) is further approximated as $$V/V_0(RH; T_0) \approx a\{1 - (RH/RH_0)^{2m}/2\} + (1-a),$$

$$= 1 - (a/2)(RH/RH_0)^{2m}, \quad (7)$$

which is linear and decreasing in the quantity $(RH/RH_0)^{2m}$, and thus linear in the variable RH if 2m=1. More generally, the measured relative response value $V/V_0$ ($RH; T_0$) is substantially monotonically decreasing in the value RH and resembles a trapezoid with a non-zero tail value, as illustrated in the generalized curve shown in FIG. 16.

Figure 16:
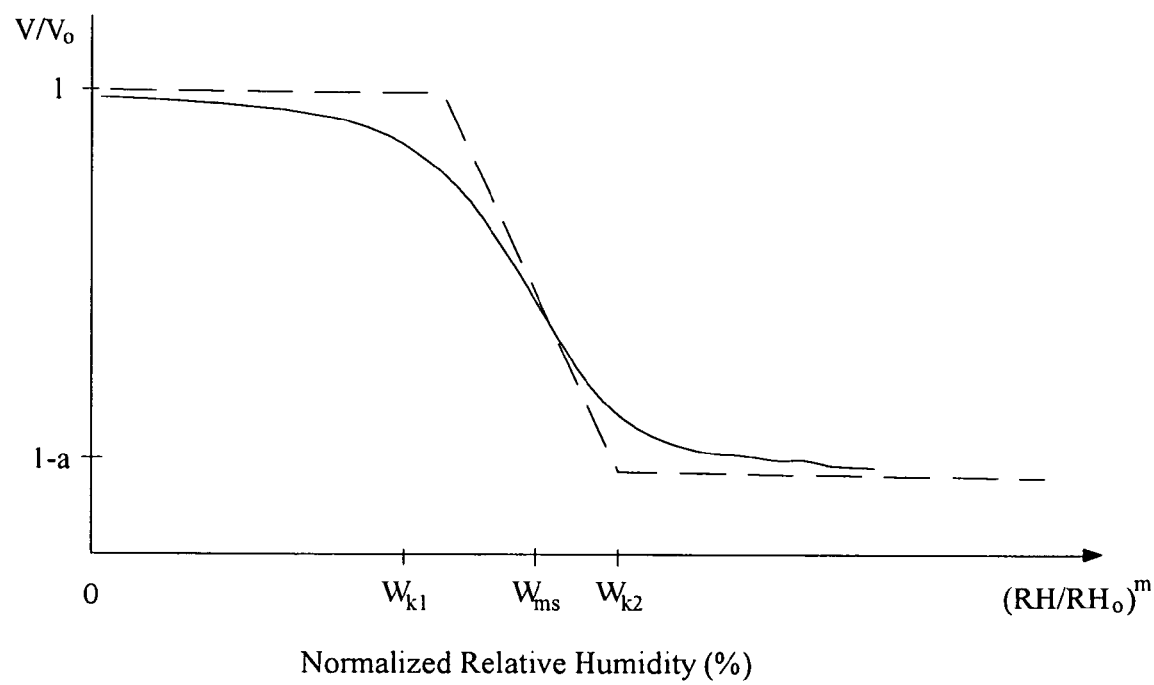
FIG. 16 graphically illustrates variation of an approximation function for a measured electrical parameter with varying relative humidity RH for an SWCNT coated with an unspecified substance.

Introducing the dimensionless variable $$u = (RH/RH_0)^m, \quad (8)$$

several interesting values of u can be identified on FIG. 16: (1) a knee value, $u = w_{K1}$, where the first w-derivative is changing most rapidly; (2) a maximum slope value, $u = u_{MS}$, where the (negative) slope or u-derivative is a maximum value; and (2) a second knee value, $u = u_{K2}$ ($> u_{K1}$), where the first u-derivative is again changing most rapidly. The values are estimated from the identities $$(\partial^2 F_e / \partial u^2)_{wK} = a \cdot \text{sech}^3 u \{\sin h^2 u - 1\}_K = 0, \quad (9A)$$

$$(\partial^3 F_e / \partial u^3)_{wMS} = a \cdot \text{sech}^4 u \{\cos h^2 u - 4\}_{MS} = 0, \quad (9B)$$

The value of the parameter a in the interval $0 < a \leq 1$ is not relevant here. The solutions of Eqs. (9A) and (9B) are verified to be $$u_K = \sin h^{-1}\{1\} = \ln\{\sqrt{2} \pm 1\}, \quad (10A)$$

$$u_{K\backslash MS} = \ln\{2 \pm \sqrt{3}\}, \quad (10B)$$

With appropriate choices of the parameter values $RH_0$ and m in Eq. (8), the experimentally observed locations of the values $u_{MS}$ and $u_{K1}$ can be matched.

An appropriate value of the parameter a can be determined as follows. Let $u=u_f$ correspond to the value of u for which $F_e(u_f)=g$ (0<g<1). From Eq. (6), this requires that $$a \cdot sech(u_f)+1-a=g, \qquad (11A)$$

$$sech(u_f)=1-(1-g)/a, \qquad (11B)$$

which requires that a lie in a reduced range, $1-g<a \leq 1$. Equations (9A), (6B) and either (10A) or (10B) can be used to estimate $RH_0$, m and a.

If the approximation in Eq. (6) is adopted, the zero point relative response $V/V_0(RH=0)$ for a particular coating or dopant material can be compensated for the presence of moisture (RH>0) by a compensation factor such as $$V_0(RH=0)=V(RH>0)/\{a \cdot sech\{(RH/RH_0)^m+(1-a)\}. \qquad (12)$$

Other approximations, such as replacing the sech(u) function in Eq. (6) by sec(u), or by $\exp\{-u^2/u_0^2\}$, for example, can also be used here for RH compensation.

For a given coating or doping material and fixed temperature, the measured relative response V(RH;meas)/$V_0$, as relative humidity RH is increased over a sequence of values, can be compared with corresponding reference values V(RH;ref; h)/$V_0$ for each of a plurality of candidate fluids (h=1, ..., H) to determine if a particular candidate fluid is present. Appendix C sets forth an analytical procedure for determining if a target fluid is likely to be present, from a comparison of measured relative response values V/$V_0$ for a variable environmental parameter, such as relative humidity, temperature or pressure.

This technology combines physical and chemical measurements in a single system and allows simultaneous measurements to be made for real time monitoring. By providing a system, shown schematically in FIG. 10, in each producing horizon of a plurality of adjacent mineral wellsites, real time monitoring of an entire mineral field, and of its reaction to pressurization or other perturbation at one or more locations, can be implemented; real time feedback is now available for modification of the perturbing force(s) in the field.

A nanosensor array has been developed to estimate a ratio of $H_2O$ (vapor or liquid) to a representative hydrocarbon(s) ("HC," for example, a paraffin) in a wellsite fluid, in or adjacent to a headspace above a drill bit or other exploratory mechanism. For a specified electrical parameter ELP, such as change in electrical resistance, in electrical conductance, in voltage difference or in electrical current, a sequence of reference ELP values ($\Delta V$=ELPV) is estimated or otherwise determined, as a function, $\Delta V_1 = F1\{VP(T;H_2O)\}$, of $H_2O$ vapor pressure present and, separately, as a function, $\Delta V_2 = F2\{PV(T;HC)\}$, of HC vapor pressure present in or adjacent to the headspace. The vapor pressure VP of each of the $H_2O$ and the HC mixture will increase monotonically with increasing temperature T. Water molecules are highly polar, whereas an HC molecule (e.g., $C_6H_6$) is generally nonpolar.

For a given wellsite and associated well headspace, one or more measurements are performed of the ELPV $\Delta V$, with contributions to $\Delta V$ from $H_2O$, from drilling mud ("DM"), and from the extant HC mixture. For a given (measured) wellsite temperature T, the measured total vapor pressure VP(T) in the headspace is a sum of partial fractions, $$VP(T)=\alpha VP(T;H_2O)+\beta VP(T;HC)+(1-\alpha-\beta)VP(T;DM) \qquad (13)$$

of the component fluids, where VP(T;DM) is often small enough to be ignored, equivalent to setting $1-\alpha-\beta \approx 0$. The ratio $$\Delta V_1/\Delta V_2 = F1\{VP(T;H_2O)\}/F2\{PV(T;HC)\} \approx R(T) \cdot \alpha/(1-\alpha) \qquad (14)$$

is taken as a measure of the $H_2O$/HC ratio present in the head space, where R(T) is known or determinable. The two quantities $\Delta V_1$ and $\Delta V_2$ are both positive, which ensures that a lies in the range $0<\alpha \leq 1$. The quantity VP(T;$H_2O$) can be estimated from empirical or theoretical data, and total VP can be measured so that VP(T;$H_2O$) and VP((T;HC)=VP(total)-VP(T;$H_2O$) can be estimated for the arguments of the functions F1 and F2.

Figure 17:
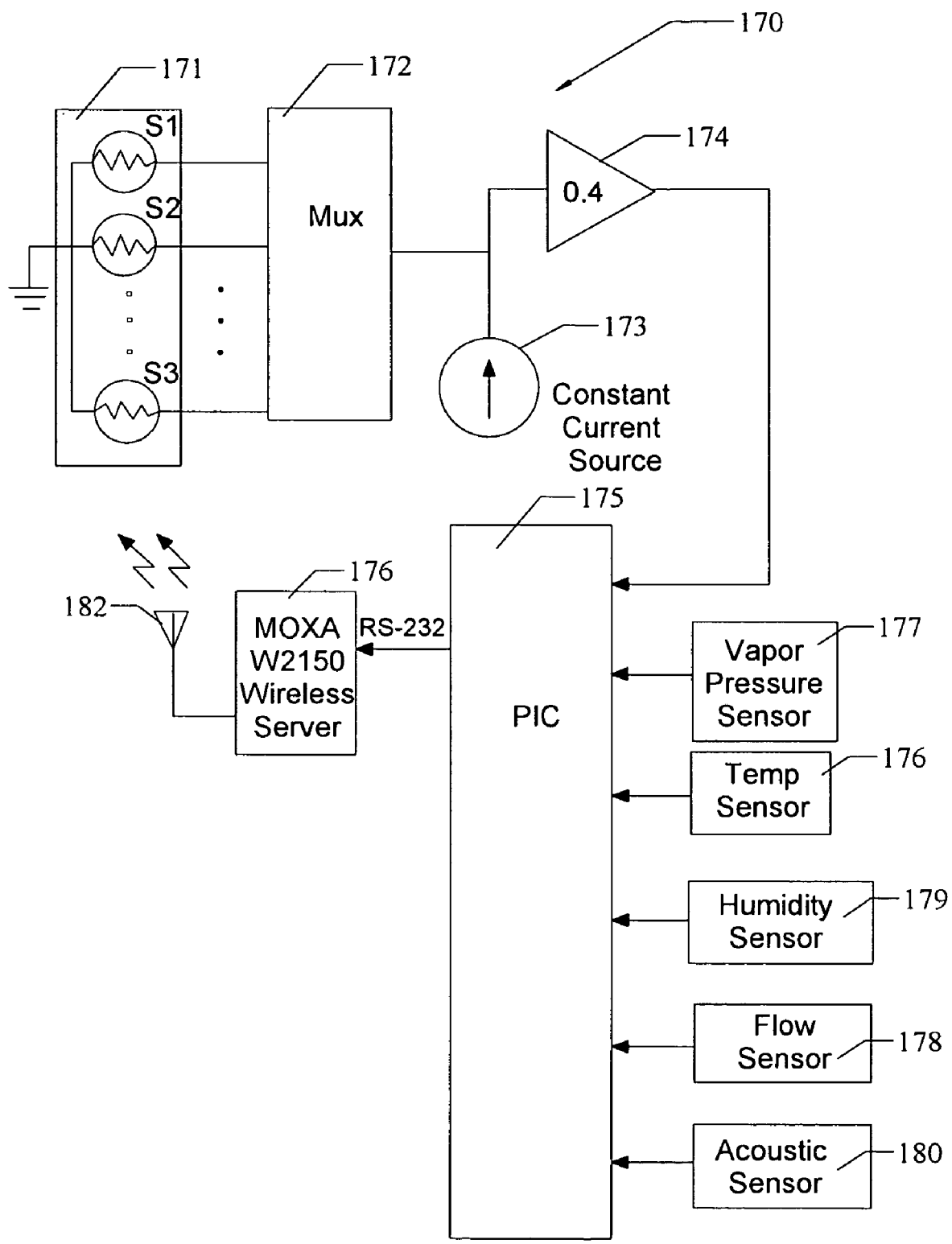
FIG. 17 schematically illustrates a downhole wireless transmission system for use with the invention.

A wireless transmission system for data accumulated in a down-hole environment is disclosed by Jing Li in "A Wireless Portable Carbon Nanotube-Based Chemical Sensor System," unpublished. FIG. 17 schematically illustrates components of the system 170, which includes a chemical nanosensor module 171, whose output signals (four, in one embodiment) are received by a multiplexer 172. The MUX output signal is augmented by a constant current source 173 and is passed through a buffer amplifier 174 (optional) and received by a microcontroller 175 (e.g., a PIC16F688, available from Microchip Technologies). The microcontroller 175 also receives a signal from at least one of a temperature microsensor 176, a vapor pressure microsensor 177, a flow microsensor (direction, velocity) 178, a relative humidity micro sensor 179 and an acoustic or electromagnetic distance sensor 180. The microcontroller output signals (e.g., in RS-232 format) are received by a wireless server 181 (e.g., a MOXA W2150), which transmits these signals, using 802.11b protocol, through an antenna 182 to a LAN. The transmitted signals are received by a receiver (not shown) that is spaced apart from the transmission system 171, for display and/or further signal processing.

A nanosensor includes two or more functionalized CNTs for sensing presence, and optionally amount, of one or more target chemicals. A microsensor may use nanosensors and/or conventional sensors to estimate one or more physical parameters, such as temperature, fluid pressure, relative humidity and distance.

Appendix A. Estimation of Concentration of a Fluid Component.

FIG. 6 is a flow chart of a procedure for estimating concentration of a fluid component that is suspected to be present. This approach requires knowledge of certain response coefficients relating change of a response value to increase or decrease in concentration of a particular fluid component G. In step 61, response coefficients $a_{n,m}$ (n=1, ..., N; m=1, 2, ..., M) are estimated or otherwise provided for M single constituent fluids (numbered m=1, ..., M; M$\geq$2) (such as $NO_2$, $Cl_2$ and HCl or for any other three fluids of interest), in the presence of SWCNTs individually coated with each of N selected coatings (numbered n=1, ..., N; N$\geq$1), for example, with chlorosulfonated polyethylene (n=1) and (separately) with hydroxypropyl cellulose (n=2).

For an SWCNT coated with coating number n, $$V_n(G;meas)-V_0(G;meas)=a_{n,1} \cdot c_{NO2}+a_{n,2} \cdot c_{Cl2}+a_{n,3} \cdot c_{HCl}, \qquad (A1)$$

where, for example, $c_{NO2}$ represents the $NO_2$ concentration (e.g., expressed in ppm or in ppb). The set of response coefficients $\{a_{n,m}\}_m$, for different coatings, n=n1 and for n=n2 ($\neq$n1), will differ from each other, but each set is determined or estimated by measurement of the response value difference, $V_n(G;meas)-V_0(G;meas)$, of coated (n) versus uncoated (n=0), for each of the two (or, more generally, $M \geq 2$) single constituent fluids present in a known concentration. For a single constituent fluid $NO_2$ and no coating (n=0), for example, $a_{0,1}=0.034\pm0.002$.

In step 62, a known increment of one (or more) of the (suspected) constituent (e.g., $NO_2$ or $Cl_2$ or HCl), is added to the unknown fluid G to provide an augmented fluid G'. In step 63, the response values, $V_0(G;meas)$ and $V_0(G';meas)$, for the uncoated SWCNT network (n=0), in the presence of the fluids G and G', are measured or otherwise provided. In step 64, the response values, $V_n(G;meas)$ and $V_n(G';meas)$, for the SWCNT network coated with the (single) coating number n, in the presence of the fluids G and G', respectively, are measured or otherwise provided.

In step 65, an error function $\epsilon$, defined by $$2\epsilon(x,y,z) = \Sigma_n w_n \cdot \{V_n(G;meas) - V_0(G;meas) - a_{n,1}c_1 - a_{n,2}c_2 + a_{n,3}c_3\}^2 + \Sigma_n w'_n \cdot \{V_n(G';meas) - V_0(G';meas) - a_{n,1}(c_1+\Delta c_1) - a_{n,2}c_2 + a_{n,3}c_3\}^2, \quad (A2)$$

is provided, where $c_1$, $c_2$ and $c_3$ refer to the concentrations of the reference molecule, the first fluid molecule and the second fluid molecule, $\Delta c_1$ is a known concentration increment of a selected one ($c_1$) of the reference molecule, the first fluid molecule or the second fluid molecule, added to the fluid G to provide the augmented fluid G', and $w_n$ and $w'_n$ are selected non-negative weight values. The two sums in Eq. (A2) represent the contributions of the initial composition and the augmented composition, respectively. These sums over n may include one, two, three or more loadings for which the response coefficients are known. In this example, n=1, 2.

The error function $\epsilon(c_1, c_2, c_3)$ is to be minimized with respect to choices of the (unknown) concentration values $c_1$, $c_2$ and $c_3$. Differentiating $\epsilon$ with respect to each of the variables $c_1$, $c_2$ and $c_3$, in step 66, one obtains three coupled linear equations in these variables:

$$\{(w_1 + w'_1)a_{1,1}^2 + (w_2 + w'_2)a_{2,1}^2\}c_1 + \qquad (A3)$$
$$\{(w_1 + w'_1)a_{1,1}a_{1,2} + (w_2 + w'_2)a_{2,1}a_{2,2}\}c_2 +$$
$$\{(w_1 + w'_1)a_{1,1}a_{1,3} + (w_2 + w'_2)a_{2,1}a_{2,3}\}c_3 =$$
$$\{w_1(V_1(G;meas) - V_0(G;meas)) +$$
$$w'_1(V_1(G';meas) - V_0(G';meas)) - a_{1,1}\Delta c_1)\}a_{1,1} +$$
$$\{w_2 V_2(G;meas) - V_0(G;meas)) +$$
$$w'_2(V_2(G';meas) - V_0(G';meas)) -$$
$$a_{2,1}\Delta c_1)\}a_{2,1}, \{(w_1 + w'_1)a_{1,1}a_{1,2} + (w_2 + w'_2)$$
$$a_{2,1}a_{2,2}\}c_1 + \{(w_1 + w'_1)a_{1,2}^2 + (w_2 + w'_2)a_{2,2}^2\}c_2$$

In step 66, Eqs. (A1)-(A5) in the unknowns $c_1$, $c_2$ and $c_3$ are determined, using standard matrix inversion techniques, after verification that a 3×3 (more generally, M×M) coefficient matrix for the vector $[c_1 \, c_2 \, c_3]^{tr}$ has a non-zero determinant. These solutions, $[c_1 \, c_2 \, c_3]^{tr}$, provide estimates of the concentration values of the corresponding chemicals in the fluid G (or in the fluid G') in step 66 of FIG. 6.

Preferably, at least two of the weight values in Eq. (A2) are positive (e.g., ($w_1$, $w_2$) or ($w'_1$, $w'_2$) or ($w_1$, $w'_2$) or ($w'_1$, $w_2$)), and the relative sizes of the non-zero weights reflect the relative importance of the response measurements. If, as is likely, the four response measurements are believed to be equally important, one can choose $w_1=w_2=w'_1=w'_2=1$. One can ignore one or two of the four measurements, in which event the corresponding weight value(s) is set equal to 0.

The response coefficients $a_{n,m}$ used in Eqs. (A1) and (A2) are not necessarily positive. For example, the response coefficient $a_{i,j}$ for the fluid constituent $NO_2$ is positive for several of the SWCNT coatings used, while the response coefficient $a_{ij}$ for $NH_3$ is observed to be negative for at least one of these coatings.

More generally, where M reference fluid components (numbered m=1, . . . , M1) and target fluid components (numbered m=M1+1, . . . , M1+M2=M) with unknown concentrations are believed to be present and N coatings (numbered n=1, . . . , N), the error function $\epsilon$ (analogous to Eq. (A2)) is defined by $$2\epsilon(c_1, \ldots, c_M)) = \rho_n w_n \cdot \{V_n(G;meas) - V_0(G;meas) - \Sigma_m a_{n,m}c_m\}^2 + \Sigma_n w'_n \cdot \{V_n(G';meas) - V_0(G';meas) - \Sigma_m a_{n,1}(c_m+\Delta c_m)\}^2, \quad (A6)$$

where one, or more then one, concentration value $c_m$ is augmented by a known amount $\Delta c_m$. The error function $\epsilon$ is minimized by differentiation with respect to each of the unknown concentration values $c_m$. This yields M coupled equations $$\Sigma_n w_n \cdot \{V_n(G;meas) - V_0(G;meas) - \Sigma_m a_{n,m}c_{m0}\}a_{n,m0} + \Sigma_n w'_n \cdot \{V_n(G';meas) - V_0(G';meas) - \Sigma_m a_{n,m}(c_{m0}+\Delta c_{m0})\}a_{n,m0} = 0, \quad (A7)$$

for index values m0=1, 2, . . . , M. These can be restated in a matrix format as $$\Sigma_n(w_n+w'_n)\{\Sigma_m a_{n,m}c_{m0}\}a_{n,m0} = \Sigma_n w_n \cdot \{V_n(G;meas) - V_0(G;meas)\} + \Sigma_n w'_n \cdot \{\Sigma_m a_{n,m}\Delta c_{m0}\}a_{n,m0}, + \Sigma_n w'_n \cdot \{V_n(G';meas) - V_0(G';meas)\}. \quad (A8)$$

After verifying that the determinant of the M×M matrix of coefficients for the quantities $c_{m0}$ in Eq. (A8) is non-zero, this M×M matrix can be inverted to determine estimates for the concentration values $c_{m0}$ (m0=1, . . . , M). These concentration value estimates will depend, in part, upon the relative values chosen for the weight values $w_n$ and $w'_n$ for the coatings. Where one or more of the reference molecule concentration values $c_{m0}$ (m0=1, . . . , M1) are known in advance, the estimates for these reference concentration values can be compared with the corresponding known values to evaluate the likely accuracy of the remaining estimated values.

The approach set forth in this Appendix A can also be used to estimate an initial concentration value $c_{m0}$ where the CNT network is doped or otherwise loaded, rather than being coated.

Appendix B. Determination of Bound on Fluid Component Concentration.

A second algorithm does not require provision of a large number of response coefficients $a_{i,j}$ but only seeks to determine if a particular target molecule is present in at least a selected concentration. For a selected coating, such as chlorosulfonated polyethylene or hydroxypropyl cellulose or a transition element TE, on the CNT, a measurement of the response value difference $\Delta V=V(coated)-V(uncoated)$ is taken for modified fluids, G'(1) and G'(2), where each of two distinct supplemental concentration values, $\Delta_1 c(m0)$ and $\Delta_2 c(m0)$, respectively, for a selected molecule no. m0 (e.g., $NO_x$ or $Cl_2$ or HCl) is added to the original fluid G. The concentration value $c_0(m0)$ of the selected molecule present in the original fluid G is unknown, and the configuration of the CNT network is unknown. It is assumed that the response value difference ΔV increases approximately linearly with the concentration difference Δc(m0) of the selected molecule so that)

$$\Delta V_1(m0) = v_0 + v_1 \cdot (c_0(m0) + \Delta_1 c(m0)), \quad (B1)$$

$$\Delta V_2(m0) = v_0 + v_1 \cdot (c_0(m0) + \Delta_2 c(m0)). \quad (B2)$$

A molecule m0 should be chosen for which $|\Delta_2 c(m0) - \Delta_1 c(m0)|$ is at least equal to a selected positive threshold. The quantities $v_0$, $v_1$ and $c_0(m0)$ are then related by the equations $$v_1 = (\Delta V_2(m0) - \Delta V_1(m0))/\{\Delta_2 c(m0) - \Delta_1 c(m0)\}, \quad (B3)$$

$$v_0 + v_1 c_0(m0) = \Delta V_1(m0) - v_1 \Delta_1 c(m0) \quad (B4)$$
$$= \Delta V_2(m0) - v_1 \Delta_2 c(m0)$$

and $v_0$ and $v_1$ are determined, in part, by the CNT network configuration (assumed fixed and reusable) that is present. Where, as is likely, $v_0 \geq 0$, one infers that the initial concentration value $c_o(m0)$ for the molecule m0 is limited by $$c_0(m0) = \{\Delta V_1(m0) - v_0\}/v_1 - \Delta_1 c(m0) \leq \{\Delta V_1(m0)/v_1\} - \Delta_1 c(m0) \quad (B5-1)$$

or $$c_0(m0) = \{\Delta V_2(m0) - v_0\}/v_1 - \Delta_2 c(m0) \leq \{\Delta V_2(m0)/v_1\} - \Delta_2 c(m0) \quad (B5-2)$$

Equations (B5-1) and (B5-2) provide an upper bound for the quantity $c_0(m0)$. Where it is known that the coefficient $v_0$ is non-positive, Eqs. (B5-1) and (B5-2) can be inverted to provide lower bounds for the concentration:

$$c_0(m0) = \{\Delta V_1(m0) - v_0\}/v_1 - \Delta_1 c(m0) \geq \{\Delta V_1(m0)/v_1\} - \Delta_1 c(m0) \quad (B6-1)$$

or $$c_0(m0) = \{\Delta V_2(m0) - v_0\}/v_1 - \Delta_2 c(m0) \geq \{\Delta V_2(m0)/v_1\} - \Delta_2 c(m0) \quad (B6-2)$$

This Approach does not Provide a Direct Estimate for the Quantity $C_0(M0)$, Only an indication of whether the molecule m0 is or is not present in a concentration of no more than the right hand quantity in Eqs. (B5-1) or (B5-2). However, this approach does not require determination and use of the response coefficients $a_{i,j}$ that are required for the putatively more accurate method set forth in Appendix A. The method of Appendix B can be used to estimate upper (or lower) bounds for concentration values c of one, two or more selected molecules.

FIG. 7 is a flow chart of a procedure for estimating an upper bound for a concentration value $c_0(m0)$ for a selected molecule in the fluid G. It is assumed that the response value difference ΔV varies approximately linearly with the concentration difference Δc(m0) of the selected molecule. In step 71, first and second (distinct) known increments, $\Delta_1 c(m0)$ and $\Delta_2 c(m0)$, of a selected molecule m0 are added to a fluid G to provide first and second augmented fluids, G1 and G2. In step 72, response value differences, $$\Delta V_1(m0)) = V(G1;\text{meas}) - V(G;\text{meas}), \quad (B7)$$

$$\Delta V_2(m0)) = V(G2;\text{meas}) - V(G;\text{meas}), \quad (B8)$$

are measured or otherwise provided. In step 73, the coefficient v1 in an approximation for response value differences $$\Delta V_1(m0) = v_0 + v_1 \cdot \{c_0(m0) + \Delta_1 c(m0)\}, \quad (B9)$$

$$\Delta V_2(m0) = v_0 + v_1 \cdot \{c_0(m0) + \Delta_2 c(m0)\}, \quad (B10)$$

is determined according to $$v_1 = (\Delta V_2(m0) - \Delta V_1(m0))/\{\Delta_2 c(m0) - \Delta_1 c(m0)\}. \quad (B11)$$

In step 74, the system queries whether the coefficient $v_0$ is likely non-negative. If the answer to the query in step 74 is "yes," the system estimates an upper bound for the initial concentration value $c_0(m0)$, in step 75:

$$c_0(m0) \leq \{\Delta V_1(m0)/v_1 - \Delta_1 c(m0) = \Delta V_2(m0)/v_1 - \Delta_2 c(m0) \quad (v_0 \geq 0). \quad (B12)$$

If the answer to the query in step 74 is "no," the system estimates a lower bound for the initial concentration value $c_0(m0)$, in step 76:

$$c_0(m0) \geq \{\Delta V_1(m0)/v_1 - \Delta_1 c(m0) = \Delta V_2(m0)/v_1 - \Delta_2 c(m0) \quad (v_0 \leq 0). \quad (B13)$$

Appendix C. Effect of Varying Environmental Parameter.

Figure 18:
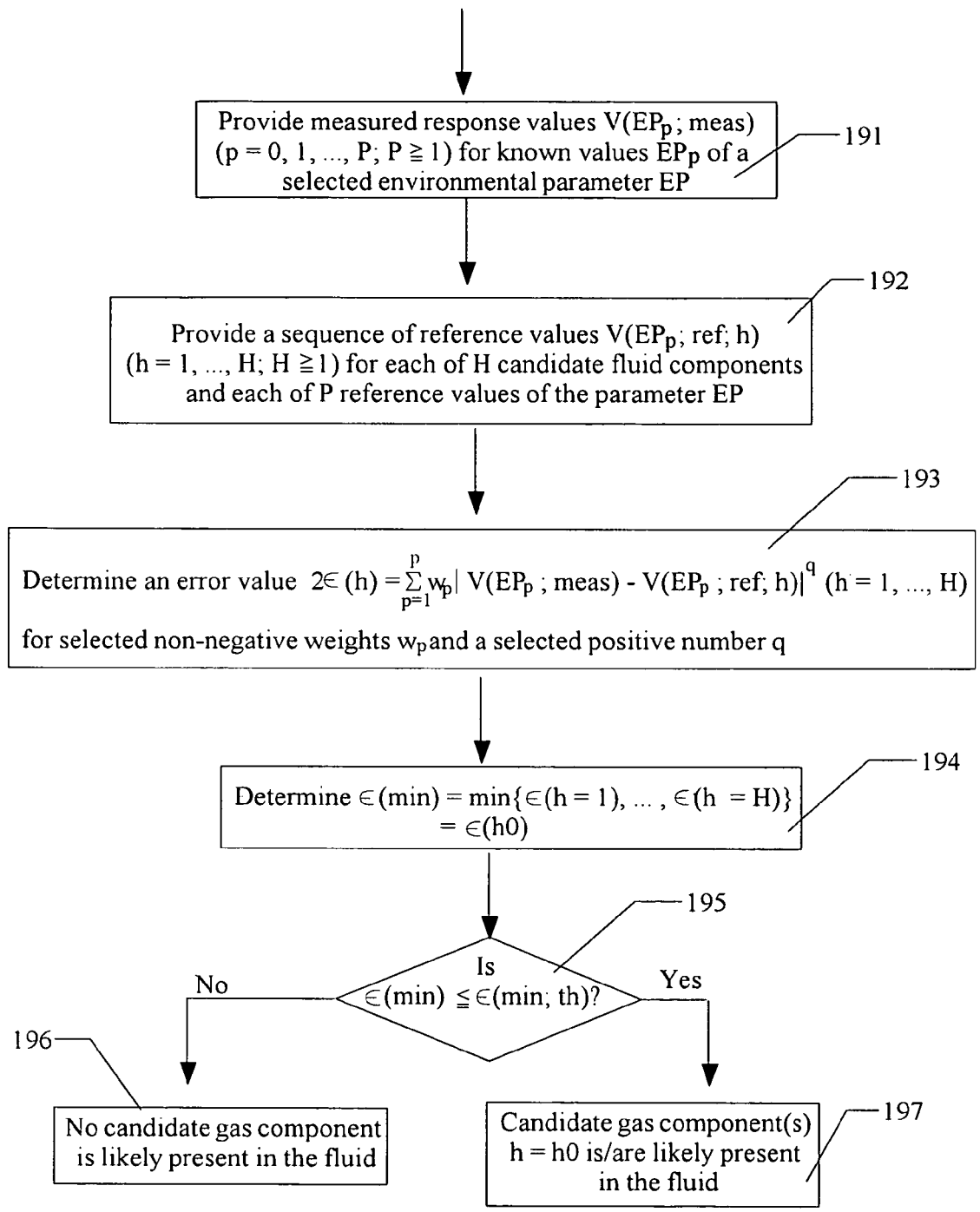
FIG. 18 is a flow chart of a procedure for practicing the invention for a selected environmental parameter.

FIG. 18 is a flow chart of a procedure for estimating concentration of a candidate fluid component, suspected to be present in a target fluid, where a response parameter V is associated with a controllably varied environmental parameter ("EP"), and measurements of the response V(G;meas) are available for a sequence of reference values of EP, $\{EP_p\}_p$. The environmental parameter(s) EP may be one or more of the following: relative humidity RH, temperature T, gauge pressure GP, ambient chemicals present AC, and elapsed time Δt since the test sample was prepared.

In step 191, measurements of the response $V(EP_p;\text{meas})$ (p=0, 1, . . . , P;P≥1) are provided, where p=0 may correspond to EP equal to a reference value, such as RH=0 or 0.1, for example. In step 192, a sequence of reference values $V(EP_p;\text{ref};h)$ (h=1, . . . , H:H≥1) is provided, for each of H candidate fluid components and for each of P reference values of the environmental parameter EP. In step 193, the system determines an error value $$2\varepsilon(h) = \left\{ \sum_{p=1}^{P} w_p \mid V(EP_p;\text{meas}) - V(EP_p;\text{ref};h) \mid \right\} (h = 1, \ldots H), \quad (C1)$$

where $w_p$ is a non-negative weight associated with the environmental parameter value $EP_p$ and q is a selected positive number (e.g., q=1 or 2). If desired, the approximation $F_e((EP/EP_0)^m;a)$ in Eq. (6) may be substituted for the reference quantity $V(EP_p;\text{ref};h)$.

In steps 194 and 195, a minimum error value (or values)

$$\varepsilon(\text{min}) = \min\{\varepsilon(h=1), \ldots, \varepsilon(h=H)\} \quad (C2)$$

is/are determined (e.g., ε(min)=ε(h=h0)), and ε(min) is compared with a selected threshold value ε(min;thr). If $$\varepsilon(\text{min}) = \varepsilon(h=h0) \leq \varepsilon(\text{min;thr}), \quad (C3)$$

the system interprets these conditions as indicating that the candidate fluid component(s) corresponding to h=h0 is/are likely present in the target fluid, in step 206. If the condition (C3) is not satisfied, the system interprets this result as indicating that none of the fluid component(s) h0 is likely to be present in the target fluid, in step 197.

What is claimed is:

1. A system for monitoring and evaluating status of an array of one or more underground mineral-producing wellsites, the system comprising:
   a first chip comprising: (i) a first nanosensor to estimate $H_2O$ content present in the wellsite; and (ii) a second nanosensor to estimate presence or absence of each of at least first and second different target gas molecules in the wellsite;
   a second chip containing (iii) a temperature microsensor to estimate local temperature in an underground fluid mineral-producing wellsite; and at least one of: (iv) a pressure microsensor to estimate local fluid pressure adjacent to the wellsite; (v) a distance microsensor to provide an estimate of distance to each of at least two spaced apart surfaces bounding the fluid mineral in the wellsite; (vi) a fluid flow microsensor to estimate at least one of flow direction and flow velocity of a fluid adjacent to the wellsite; and
   a wireless data transmission mechanism to receive and process data from the first and second nanosensors and from the at least one microsensor, and to transmit the processed data to a receiver spaced apart from the data transmission mechanism.

2. The system of claim 1, wherein said second nanosensor is configured to estimate presence or absence of said at least first and second target gas molecules drawn from the group of carbon-containing molecules consisting of $C_{m2}H_{n2}$ ($m2 \geq 1$; $n2=2m2$, $2m2+1$ or $2m2+2$), and $C_{m1}H_{n1}O$ ($m1 \geq 1$; $n1 \leq 2m1+2$).

3. The system of claim 1, wherein said first nanosensor comprises:
   an array of carbon nanosensor structures (CNSs), wherein at least one CNS in the array is loaded with a selected loading substance between first and second ends of the at least one CNS, and the first and second ends are connected: to at least one of a voltage source and a current source, and to an electrical parameter measurement mechanism that measures a change in at least one of electrical current, voltage difference, electrical resistance and electrical conductance between the first and second ends of the at least one CNS; and
   a computer programmed (1) to receive and compare the measured electrical parameter with a reference electrical parameter value and to estimate at least one of: (i) said $H_2O$ content of said fluid adjacent to the at least one loaded CNS and (ii) presence or absence of each of said at least two target molecules in said wellsite; (2) to receive first and second incremental values, $\Delta V_1$ and $\Delta V_2$, associated with a change in said measured electrical parameter associated with $H_2O$ and with a representative hydrocarbon, respectively; (3) to form a ratio $\Delta V_1/\Delta V_2$; and (4) to interpret this ratio as approximately proportional to $\alpha/(1-\alpha)$, where $\alpha$ ($0 \leq \alpha \leq 1$) is a fraction of $H_2O$ present in a mixture of fluids in a head space for said wellsite.

4. The system of claim 3, wherein said at least one CNS is loaded with a coating on at least one surface of said at least one CNS.

5. The system of claim 3, further comprising loading wherein said at least one CNS is loaded with a dopant distributed within said at least one CNS.

6. The system of claim 3, wherein said loading substance includes one or more of the substances hydroxypropyl cellulose and chlorosulfonated polyethylene.

7. The system of claim 3, wherein said loading substance includes one or more of the substances Pd, Pt, Ru, Rh, Ir, Os, Au, Ag and Hg.

8. The system of claim 1, wherein at least one of said first target gas molecule and said second target gas molecule includes at least one of a hydrocarbon and an oxide of carbon.

9. The system of claim 1, wherein said fluid flow microsensor comprises first, second and third microsensors, spaced apart and non-collinear, to sense at least one of (i) correlation of a flow of first and second fluid flow components and (ii) correlation of a flow of first and third fluid flow components.

10. The system of claim 1, wherein said flow microsensor is configured to measure at least one of said fluid flow direction and said fluid flow velocity in response to injection of a pressurized fluid at a location spaced apart from said wellsite.

11. The system of claim 1, wherein said second chip comprises:
   an array of carbon nanosensor structures (CNSs), wherein at least one CNS in the array is loaded with a selected loading substance at one or more locations between first and second ends of the at least one CNS, and the first and second ends are connected to at least one of a voltage source and a current source, and are connected to an electrical parameter measurement mechanism that measures a change in at least one of electrical current, voltage difference, electrical resistance and electrical conductance between the first and second ends of the at least one CNS for each of said at least first and second target gas molecules; and
   a computer that is programmed to receive and compare the measured electrical parameter with a reference electrical parameter value and to estimate at least one of: relative humidity present at the at least one loaded CNS, temperature present at the at least one loaded CNS; fluid pressure present at the at least one loaded CNS.

12. A method for analyzing status of an underground mineral-producing wellsites, the method comprising:
   receiving first data at a first chip comprising: (i) a first nanosensor configured to estimate water content present in the wellsite; and (ii) a second nanosensor configured to estimate presence or absence of each of at least first and second different target gas molecules in the wellsite;
   receiving second data at a second chip containing at least one of: (iii) a temperature microsensor to estimate local temperature in an underground fluid mineral-producing wellsite; (iv) a pressure microsensor to estimate local fluid pressure adjacent to the wellsite; (v) a distance microsensor to provide an estimate of distance to each of at least two spaced apart surfaces bounding the fluid mineral; (vi) a fluid flow microsensor to estimate at least one of flow direction and flow velocity of a fluid adjacent to the wellsite; and
   processing the first data and the second data, and transmitting the processed data to a receiver spaced apart from the data transmission mechanism.

13. The method of claim 12, further comprising drawing said target molecules from the group of molecules consisting of $C_{m2}H_{n2}$ ($m2 \geq 1$; $n2=2m2$, $2m2+1$, $2m2+2$), $H_2O$ and $C_{m1}H_{n1}O$ ($m1 \geq 1$; $n1 \leq 2m1+2$).

14. The method of claim 12, further comprising providing said first nanosensor with an array of carbon nanosensor structures (CNSs), wherein at least one CNS in the array is loaded with a selected loading substance between first and second ends of the at least one CNS, and the first and second ends are connected: to at least one of a voltage source and a current source, and to an electrical parameter measurement mechanism that measures a change in at least one of electrical current, voltage difference, electrical resistance and electrical conductance between the first and second ends of the at least one CNS; and providing a computer programmed to receive and compare the measured electrical parameter with a reference electrical parameter value and to estimate at least one of: (i) said water content of said fluid adjacent to the at least one loaded CNS and (ii) presence or absence of each of said at least first and second target gas molecules in said wellsite.

15. The method of claim 14, wherein said computer is further programmed:

to receive first and second incremental values, $\Delta V_1$ and $\Delta V_2$, associated with a change in said measured electrical parameter associated with $H_2O$ and with a representative hydrocarbon, respectively;

to form a ratio $\Delta V_1/\Delta V_2$; and to interpret this ratio as approximately proportional to $\alpha/(1-\alpha)$, where $\alpha$ ($0 \leq \alpha \leq 1$) is a fraction of $H_2O$ present in a mixture of fluids in a head space for said wellsite.

16. The method of claim 14, further comprising loading said at least one CNS by providing a coating of said loading substance on at least one surface of said at least one CNS.

17. The method of claim 14, further comprising loading said at least one CNS with a dopant distributed within said at least one CNS.

18. The method of claim 14, further comprising choosing said loading substance to include one or more of the substances hydroxypropyl cellulose and chlorosulfonated polyethylene.

19. The method of claim 14, further comprising choosing said loading substance to include one or more of the substances Pd, Pt, Ru, Rh, Ir, Os, Au, Ag and Hg.

20. The method of claim 12, wherein at least one of said first gas molecule and said second gas molecule is chosen from a group consisting of a hydrocarbon and an oxide of carbon.

21. The method of claim 12, further comprising providing, as said flow microsensor, a mechanism comprising first, second and third microsensors, spaced apart and non-collinear, to sense at least one of (i) correlation of a flow of first and second fluid flow components, and (ii) correlation of a flow of second and third fluid flow components.

22. The method of claim 12, further comprising using said flow microsensor to measure at least one of said fluid flow direction and said fluid flow velocity in response to injection of a pressurized fluid at a location spaced apart from said wellsite.

23. The method of claim 12, further comprising providing, as said second chip, a mechanism comprising:

an array of carbon nanosensor structures (CNSs), wherein at least one CNS in the array is loaded with a selected loading substance at one or more locations between first and second ends of the at least one CNS, and the first and second ends are connected to at least one of a voltage source and a current source, and are connected to an electrical parameter measurement mechanism that measures a change in at least one of electrical current, voltage difference, electrical resistance and electrical conductance between the first and second ends of the at least one CNS for each of said at least two target molecules; and a computer that is programmed to receive and compare the measured electrical parameter with a reference electrical parameter value and to estimate at least one of: relative humidity present at the at least one loaded CNS, temperature present at the at least one loaded CNS; fluid pressure present at the at least one loaded CNS.

24. The method of claim 12, wherein said step of providing said second nanosensor comprises:

providing first and second interdigitated electrodes, which are connected to at least one of (i) a voltage source having a controllable voltage difference and (ii) a controllable current source;

providing a zeroth order electrically conducting network, numbered 0, of uncoated single wall carbon nanotubes ("SWCNTs") forming a path P0 between the first and second electrodes;

providing N electrically conducting networks, numbered n=1, . . . , N(N≧1) of single wall carbon nanotubes ("SWCNTs") forming paths Pn (n=1, . . . , N) between the first and second electrodes, where at least one SWCNT in each of the networks no. n (n=1, . . . , N) is loaded with molecules of a selected chemical no. n;

providing in the chamber a gas G that may have molecules of a gas constituent no. m present in a concentration $C_m$ (m=1, . . . , M; M≧1), where at least one of the concentration values $C_m$ is unknown, allowing at least one molecule of the gas G to become absorbed on at least one of the SWCNTs in each of the paths P0 in the zeroth order network and Pn in the network number n (n=1, . . . , N);

providing an electrical parameter value ("response value") $V_0(G;meas)$, associated with the path P0, of a change in at least one of (i) electrical current, (ii) electrical conductance, (iii) voltage difference and (iv) electrical resistance associated with the path P0, when the gas G is present, and providing a corresponding response value $V_n(G;meas)$, associated with the path Pn (n=1, . . . , N) when the gas G is present;

adding a known concentration increment $\Delta_1 C_{m0}$ of a gas constituent no. m0, selected from among the M constituents, to the gas G to provide an augmented gas G', allowing at least one molecule of the gas G' to become absorbed on at least one of the SWCNTs in each of the path P0 and Pn (n=1, . . . , N), and providing corresponding response values $V_0(G';meas)$ and $V_n(G';meas)$ for the gas G'; and comparing differences, $V_n(G;meas)-V_0(G;meas)$ and $V_n(G';meas)-V_0(G';meas)$ (n=1, . . . , N) of the response values and estimating at least one of (i) concentration and (ii) concentration upper bound and (iii) concentration lower bound for at least one of the first gas molecule and the second gas molecule present in at least one of the gas G and the gas G'.

25. The method of claim 24, wherein said process of estimating at least one of (i) said concentration C and (ii) said concentration upper bound and (iii) said concentration lower bound comprises:

providing an error function $c(C_1, \ldots, C_M)$, defined by $$2\epsilon(C_1, \ldots, C_M) = \Sigma_n w_n \cdot \{V_n(G;meas) - V_0(G;meas) - \Sigma_m a_{n,m} C_m\}^2 + \Sigma_n w'_n \cdot \{V_n(G';meas) - V_0(G';meas) - a_{n,m}(C_m + \Delta C_m)\}^2,$$

where $a_{n,m}$ is a response value coefficient relating change in said response value $V_n(G;meas)$ to change in said concentration $C_m$ of said constituent no. m, $\Delta C_m$ is a known concentration increment of said gas constituent no. m, added to said gas G to provide said gas G', $w_n$ and $w'_n$ are selected non-negative weight values, and at least one increment value $\Delta C_m$ is positive;

providing non-negative values, $C_m(min)$ for said concentrations $C_m$ that minimize the value of the error function $\epsilon(C_1, \ldots, C_M)$; and associating at least one of the values $C_m(\text{min})$ with an estimate of said concentration of said constituent no. m in at least one of said gas G and said gas G'.

26. The method of claim 25, further comprising choosing said weight numbers $w_n$ and $w'_n$ to be substantially equal for at least one of said integers n.

27. The method of claim 24, wherein said process of estimating at least one of (i) said concentration C and (ii) said concentration upper bound and (iii) said concentration lower bound comprises:

adding a second known concentration increment $\Delta_2 C_{m0}$ of said selected gas constituent, selected from among the M constituents, to said gas G to provide a second augmented gas G''', allowing at least one molecule of the gas G''' to become absorbed on at least one of the SWCNTs in each of the paths P0 and Pn (n=1, ..., N), and providing corresponding response values $V_0(G''';\text{meas})$ and $V_n(G''';\text{meas})$ for the gas G''';

providing response value differences, $\Delta V_n(G';G) = V_n(G';\text{meas}) - V_n(G;\text{meas})$ and $\Delta V_n(G''';G) = V_n(G''';\text{meas}) - V_n(G;\text{meas})$;

determining a response coefficient v1 as $$v1 = \{\Delta V(G''';G) - \Delta V(G';G)\} / \{\Delta_2 C_{m0} - \Delta_1 C_{m0}\};$$ and estimating said concentration $C_{m0}$ of said selected gas constituent no. m0 in said gas G according to at least one relation $$C_{m0} = \{\Delta V(G';G) - v0\}/v1 - \Delta_1 C_{m0}\}$$

and $$C_{m0} = \{\Delta V(G''';G) - v0\}/v1 - \Delta_2 C_{m0}\},$$

where v0 is an estimated reference value of a response value difference, $\Delta V_n(G';G)$ or $\Delta V_n(G''';G)$.

28. The method of claim 27, further comprising estimating an upper bound for said concentration Cm0 according to at least one relation $$C_{m0} \leq \{\Delta V(G';G)/v1\} - \Delta_1 C_{m0}$$

and $$C_{m0} \leq \{\Delta V(G''';G)/v1\} - \Delta_2 C_{m0},$$

where said estimated reference value v0 is non-negative.

29. The method of claim 27, further comprising estimating an upper bound for said concentration Cm0 according to at least one relation $$C_{m0} \geq \{\Delta V(G';G)/v1\} \Delta_1 C_m\}$$

and $$C_{m0} \geq \{\Delta V(G''';G)/v1\} - \Delta_2 C_{m0},$$

where said estimated reference value v0 is non-positive.

30. A system for monitoring and evaluating status of an array of one or more underground mineral-producing wellsites, the system comprising:

a first chip comprising: (i) a first nanosensor to estimate $H_2O$ content present in the wellsite; and (ii) a second nanosensor to estimate presence or absence of each of at least first and second different target gas molecules in the wellsite;

a second chip containing (iii) a temperature microsensor to estimate local temperature in an underground fluid mineral-producing wellsite; and at least one of: (iv) a pressure microsensor to estimate local fluid pressure adjacent to the wellsite; (v) a distance microsensor to provide an estimate of distance to each of at least two spaced apart surfaces bounding the fluid mineral in the wellsite; (vi) a fluid flow microsensor to estimate at least one of flow direction and flow velocity of a fluid adjacent to the wellsite;

where the fluid flow microsensor comprises first, second and third microsensors, spaced apart and non-collinear, to sense at least one of (i) correlation of a flow of first and second fluid flow components and (ii) correlation of a flow of first and third fluid flow components; and a wireless data transmission mechanism to receive and process data from the first and second nanosensors and from the at least one microsensor, and to transmit the processed data to a receiver spaced apart from the data transmission mechanism.

31. A system for monitoring and evaluating status of an array of one or more underground mineral-producing wellsites, the system comprising:

a first chip comprising: (i) a first nanosensor to estimate $H_2O$ content present in the wellsite; and (ii) a second nanosensor to estimate presence or absence of each of at least first and second different target gas molecules in the wellsite;

a second chip containing (iii) a temperature microsensor to estimate local temperature in an underground fluid mineral-producing wellsite; and at least one of: (iv) a pressure microsensor to estimate local fluid pressure adjacent to the wellsite; (v) a distance microsensor to provide an estimate of distance to each of at least two spaced apart surfaces bounding the fluid mineral in the wellsite; (vi) a fluid flow microsensor to estimate at least one of flow direction and flow velocity of a fluid adjacent to the wellsite;

where the second chip further comprises an array of carbon nanosensor structures (CNSs), wherein at least one CNS in the array is loaded with a selected loading substance at one or more locations between first and second ends of the at least one CNS, and the first and second ends are connected to at least one of a voltage source and a current source, and are connected to an electrical parameter measurement mechanism that measures a change in at least one of electrical current, voltage difference, electrical resistance and electrical conductance between the first and second ends of the at least one CNS for each of said at least first and second target gas molecules;

a computer that is programmed to receive and compare the measured electrical parameter with a reference electrical parameter value and to estimate at least one of: relative humidity present at the at least one loaded CNS, temperature present at the at least one loaded CNS; fluid pressure present at the at least one loaded CNS; and a wireless data transmission mechanism to receive and process data from the first and second nanosensors and from the at least one microsensor, and to transmit the processed data to a receiver spaced apart from the data transmission mechanism.

* * * * *